US012635012B2

(12) United States Patent (10) Patent No.: US 12,635,012 B2
Yao et al. (45) Date of Patent: May 19, 2026

(54) CIS LINK ADJUSTMENT METHOD AND RELATED DEVICE

(71) Applicant: HUAWEI TECHNOLOGIES CO., LTD., Guangdong (CN)

(72) Inventors: Jing Yao, Shanghai (CN); Xingsheng Gong, Shanghai (CN); Ting Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 18/361,085

(22) Filed: Jul. 28, 2023

(65) Prior Publication Data

US 2023/0371095 A1 Nov. 16, 2023

Related U.S. Application Data

(63) Continuation of application No. PCT/CN2021/074494, filed on Jan. 29, 2021.

(51) Int. Cl.
  *H04W 76/20* (2018.01)
  *H04W 76/14* (2018.01)
(52) U.S. Cl.
  CPC ........... *H04W 76/14* (2018.02); *H04W 76/20* (2018.02)
(58) Field of Classification Search
  CPC ....... H04W 76/14; H04W 76/20; H04W 4/80; H04W 52/0219; H04W 76/40;
  (Continued)

(56) References Cited

U.S. PATENT DOCUMENTS 9,930,477 B2 * 3/2018 Song .................... H04W 76/10
2005/0198358 A1 * 9/2005 Yoshida ................. G06F 1/206
                                                    709/232

(Continued)

FOREIGN PATENT DOCUMENTS

WO      2020107466 A1    6/2020
WO      2020124610 A1    6/2020
        (Continued)

OTHER PUBLICATIONS

Bluetooth Core Specification v5.2, Dec. 31, 2019, total 3256 pages.
(Continued)

*Primary Examiner* — Cindy Trandai

(57) ABSTRACT

A connected isochronous stream (CIS) link adjustment method is provided and used to adjust a CIS link based on a target service, so that data transmission is not interrupted in a link adjustment process, to improve smoothness and reliability of the data transmission. The method includes: On a basis of transmitting data with a Bluetooth slave device on the CIS link, a Bluetooth master device generates a CIS link adjustment parameter for the Bluetooth slave device based on the target service, and sends, to the Bluetooth slave device, a link update message including the CIS link adjustment parameter. The Bluetooth master device and the Bluetooth slave device adjust the CIS link based on the CIS link adjustment parameter, to transmit data of the target service on an adjusted CIS link.

20 Claims, 8 Drawing Sheets

(58) Field of Classification Search
CPC . H04W 56/0015; H04W 84/18; H04W 88/02;
H04L 12/1881; Y02D 30/70; G06F 3/165;
H04R 2420/07
See application file for complete search history.

(56) References Cited

U.S. PATENT DOCUMENTS

| | | | |
|---|---|---|---|
| 2016/0359925 A1 | 12/2016 | Song | |
| 2017/0078836 A1* | 3/2017 | Song | H04W 8/005 |
| 2019/0045304 A1* | 2/2019 | Bhalla | H04R 3/12 |
| 2020/0196323 A1* | 6/2020 | Church | H04W 4/80 |
| 2020/0252678 A1* | 8/2020 | Elliot | H04N 21/439 |
| 2022/0014295 A1* | 1/2022 | Bonde | H04J 3/0632 |
| 2022/0030505 A1* | 1/2022 | Lee | H04W 48/10 |
| 2022/0124471 A1* | 4/2022 | Chen | H04L 1/1874 |
| 2022/0263883 A1* | 8/2022 | Lee | G10L 19/24 |
| 2022/0272644 A1* | 8/2022 | Lee | H04S 3/00 |
| 2022/0417743 A1* | 12/2022 | Lee | H04L 9/001 |
| 2024/0049116 A1* | 2/2024 | Choi | H04W 8/005 |
| 2024/0078076 A1* | 3/2024 | Lee | G06F 3/165 |

FOREIGN PATENT DOCUMENTS

| | | | |
|---|---|---|---|
| WO | 2020124611 A1 | 6/2020 | |
| WO | 2020151003 A1 | 7/2020 | |
| WO | 2021015484 A1 | 1/2021 | |

OTHER PUBLICATIONS

International Search Report and Written Opinion issued in PCT/CN2021/074494, dated Oct. 25, 2021, 10 pages.
Extended European Search Report issued in EP21921889.8, dated Oct. 4, 2023, 10 pages.

* cited by examiner

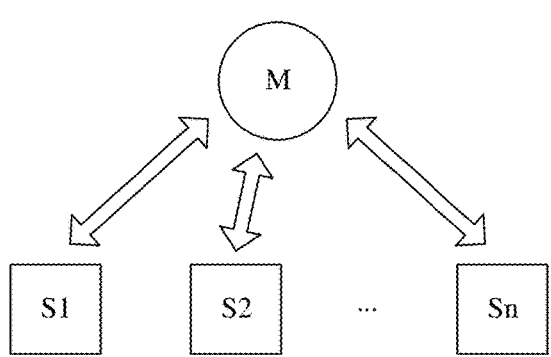

FIG. 6a

Adjustment
moment

First
Bluetooth
device
(master)

CIS event interval     CIS event interval

CIG synchronization
receiving and
sending time point

CIG synchronization
receiving and sending
time point

CIG synchronization
receiving and
sending time point

Adjustment
moment

CIS event interval     CIS event interval     CIS1 sub-
event interval

CIS1 sub-event
interval

Second
Bluetooth
device
(slave1)

CIS1 synchronization
receiving and sending
time point

CIS1 synchronization
receiving and sending
time point

CIS1 synchronization
receiving and sending
time point

Adjustment
moment

CIS event interval     CIS event compensation

CIS2 sub-event
interval

CIS2 sub-event
interval

CIS2 sub-event
interval

Third
Bluetooth
device
(slave2)

CIS2 synchronization
receiving and sending
time point

CIS2 synchronization
receiving and sending
time point

CIS2 synchronization
receiving and sending
time point

FIG. 6b

| First Bluetooth slave device | Bluetooth master device | Second Bluetooth slave device |
|---|---|---|

901: Transmit data of an initial service on a first CIS link

901: Transmit data of an initial service on a second CIS link

902: Obtain a service requirement feature corresponding to a target service

903: Separately determine a group of CIS link adjustment parameters for the first Bluetooth slave device and the second Bluetooth slave device based on the requirement feature 904: First link update message including a first CIS link adjustment parameter 905: Second link update message including a second CIS link adjustment parameter 906: Adjust the first CIS link based on the first CIS link adjustment parameter 907: Adjust the second CIS link based on the second CIS link adjustment parameter 908: Transmit data of the target service on an adjusted first CIS link 909: Transmit the data of the target service on an adjusted second CIS link

FIG. 9

Change an uplink data path

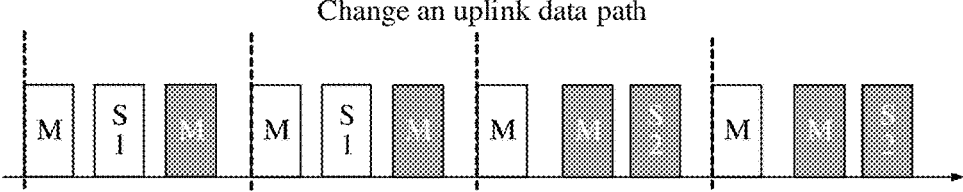

FIG. 10

CIS LINK ADJUSTMENT METHOD AND RELATED DEVICE

CROSS-REFERENCE TO RELATED APPLICATIONS

This application is a continuation of International Application No. PCT/CN2021/074494, filed on Jan. 29, 2021, the disclosure of which is hereby incorporated by reference in its entirety.

TECHNICAL FIELD

Embodiments of this disclosure relate to the Bluetooth communication field, and in particular, to a CIS link adjustment method and a related device.

BACKGROUND

A Bluetooth communication technology is a common wireless communication technology, and a Bluetooth technology includes a Bluetooth low energy (BLE) technology, to implement low power consumption transmission of data. In the BLE technology, data can be transmitted on a connected isochronous stream (CIS) link. When a data transmission service changes, the CIS link usually needs to be changed, to obtain a CIS link that matches a new service for data transmission. In this case, an original CIS link needs to be disconnected and a new CIS link needs to be established based on the new service.

In a process of disconnection and re-establishment of the CIS link, data cannot be transmitted between Bluetooth devices. In this case, each time the data transmission service changes, data transmission is interrupted due to the disconnection and re-establishment of the CIS link, and data cannot be transmitted in time.

SUMMARY

Embodiments of this disclosure provide a CIS link adjustment method and a related device, to adjust a CIS link based on a target service, so that data transmission is not interrupted in a link adjustment process, to improve smoothness and reliability of the data transmission.

A first aspect of this disclosure provides a CIS link adjustment method. The method includes:

If a Bluetooth master device separately establishes a CIS link with at least one Bluetooth slave device, the Bluetooth master device may transmit, on the CIS link, data to the Bluetooth slave device corresponding to the CIS link. The Bluetooth master device may generate a group of CIS link adjustment parameters for each Bluetooth slave device in the at least one Bluetooth slave device based on a target service. To be specific, if a quantity of Bluetooth slave devices is n, the Bluetooth master device may generate the group of CIS link adjustment parameters for each Bluetooth slave device in the n Bluetooth slave devices. n is an integer greater than or equal to 1. After the CIS link adjustment parameter is generated, the Bluetooth master device may send the corresponding CIS link adjustment parameter to each Bluetooth slave device, to indicate each Bluetooth slave device to dynamically adjust the CIS link based on the corresponding CIS link adjustment parameter. The CIS link is maintained by both the Bluetooth master device and the Bluetooth slave device. Therefore, the CIS link cannot be adjusted only by the Bluetooth slave device. Therefore, the Bluetooth master device also needs to adjust the CIS link. Specifically, the Bluetooth master device and the Bluetooth slave device need to adjust the CIS link based on the CIS link adjustment parameter corresponding to the Bluetooth slave device. The CIS link corresponds to the Bluetooth slave device. The CIS link between the Bluetooth master device and the at least one Bluetooth slave device may be adjusted, based on the corresponding CIS link adjustment parameter, by the Bluetooth master device and the Bluetooth slave device corresponding to the CIS link.

In this embodiment, when a data transmission service changes, the Bluetooth master device may generate the CIS link adjustment parameter based on the target service, and send the CIS link adjustment parameter to the Bluetooth slave device corresponding to the CIS link adjustment parameter, so that the Bluetooth master device and the Bluetooth slave device that receives the CIS link adjustment parameter adjust the CIS link between the Bluetooth master device and the Bluetooth slave device based on the CIS link adjustment parameter.

The CIS link adjustment parameter may be sent in a service data transmission process of the CIS link, and does not affect service data transmission. In addition, as long as the Bluetooth master device and the Bluetooth slave device adjust the CIS link based on the CIS link adjustment parameter at a time point indicated by the CIS link adjustment parameter, the CIS link can be adjusted in the service data transmission process. The adjustment is implemented in the service data transmission process, and is a parameter adjustment on the CIS link. The CIS link adjustment parameter may indicate a specific time point. From the time point, the Bluetooth master device and the Bluetooth slave device may perform service data transmission on an adjusted CIS link. Obtaining the CIS link adjustment parameter does not affect the service data transmission, and the CIS link does not need to be disconnected. Similarly, the parameter adjustment of the CIS link also does not affect the service data transmission, and the CIS link does not need to be disconnected.

Therefore, according to the method shown in this embodiment, the corresponding CIS link adjustment parameter may be generated based on any target service, so that the CIS link can be adjusted without interruption in the service data transmission process, and the CIS link is adjusted to a state adapted to the target service. In other words, the CIS link can be seamlessly adjusted for any target service, so that the service data transmission is not affected and not interrupted in an adjustment process. This ensures timeliness of the service data transmission.

With reference to the first aspect, in a first implementation of the first aspect of embodiments of this disclosure, the Bluetooth master device may transmit the CIS link adjustment parameter by using a link update message. Specifically, that the Bluetooth master device sends the corresponding CIS link adjustment parameter to each Bluetooth slave device may include: The Bluetooth master device sends, to each Bluetooth slave device, the link update message including the CIS link adjustment parameter corresponding to the Bluetooth slave device.

In this embodiment, the CIS link adjustment parameter is transmitted by using the link update message. The Bluetooth master device separately sends the link update message to different Bluetooth slave devices, and the message includes a CIS link update message corresponding to the Bluetooth slave device at a message receiving end.

For the link update message, a specific format of the link update message may be defined. The format may include information such as a definition of data, a location and a length occupied by the data that are included in the message, and the like. The format may be fixed or may not be fixed.

When the format is fixed or most content of the format is fixed, the CIS link may be adjusted between various Bluetooth master devices and various Bluetooth slave devices by using the link update message in a unified format. This improves universal applicability of the solutions in embodiments of this disclosure.

When some content of the format is not fixed, by using an unfixed part, data content carried in the link update message or another functions analyzed under a link update may be extended. For example, if a segment of the link update message is not fixed for transmitting specific data, data content that is not included in the link update message is carried by using the segment. This enhances extendability of the link update message.

With reference to the first aspect or the first implementation of the first aspect of embodiments of this disclosure, in a second implementation of the first aspect of embodiments of this disclosure, the CIS link adjustment parameter may include a target link parameter, a synchronization moment identifier, and a target adjustment moment. The target link parameter and the synchronization moment identifier are used to adjust the CIS link, and the target adjustment moment indicates a moment for adjusting the CIS link. To be specific, the Bluetooth master device may adjust, based on the target link parameter and the synchronization moment identifier at the time point indicated by the target adjustment moment or at the target adjustment moment, the CIS link corresponding to the target adjustment moment.

In this embodiment, when the Bluetooth master device generates and sends the foregoing three CIS link adjustment parameters, the three CIS link adjustment parameters are generated or sent in a whole group. Therefore, there is a correspondence between parameters in a group, and between each parameter, a Bluetooth slave device receiving the parameter, and an adjusted CIS link. Therefore, the adjusted CIS link also corresponds to any one of the target adjustment moment, the target link parameter, the synchronization moment identifier, and the Bluetooth slave device that receives the CIS link adjustment parameter. This is not limited herein.

In this embodiment, the CIS link adjustment parameter includes the target adjustment moment, and the target adjustment moment may indicate a moment at which CIS link adjustment occurs. Because both the Bluetooth master device and the Bluetooth slave device obtain the CIS link adjustment parameter, that is, both the Bluetooth master device and the Bluetooth slave device learn a time point at which link adjustment is to be performed, the two sides may start an adjustment at the same time. This ensures synchronization of the link adjustment. After an adjusted time point is synchronized, data receiving and sending time points may be synchronously adjusted based on the time point, the target link parameter, and the synchronization time identifier, to ensure synchronization of data receiving and sending on both sides, and effectively avoid impact on integrity, timeliness, reliability, or accuracy of the data transmission due to unaligned receiving and sending time points in a link adjustment process.

With reference to any one of the first aspect, or the first implementation or the second implementation of the first aspect of embodiments of this disclosure, in a third implementation of the first aspect of embodiments of this disclosure, the adjustment performed by the Bluetooth master device on the CIS link may specifically be an adjustment on a transmission rate of the CIS link.

In this embodiment, a difference between different services of the CIS link is mainly reflected in different rates of service data. In this embodiment, a rate of the service data of the target service may be matched by adjusting the transmission rate of the CIS link, so that the service data of the target service may be transmitted on the adjusted CIS link.

With reference to any one of the first aspect, or the first implementation to the third implementation of the first aspect of embodiments of this disclosure, in a fourth implementation of the first aspect of embodiments of this disclosure, that the Bluetooth master device generates the group of CIS link adjustment parameters for each Bluetooth slave device based on the target service may specifically include: The Bluetooth master device obtains a service requirement feature of the target service. The service requirement feature indicates an adjustment requirement for at least one of the following items: the CIS link, a rate of the CIS link, real-time performance of the CIS link, and an anti-interference capability of the CIS link. After the service requirement feature is obtained, the Bluetooth master device may generate the group of CIS link adjustment parameters for each Bluetooth slave device based on the service requirement feature.

In this embodiment, a requirement of the target service may be learned of by using the service requirement feature, and the service requirement feature may reflect the adjustment requirement of the target service for the CIS link. Therefore, in this embodiment, the adjustment on the CIS link is more targeted, and an adjusted CIS link more meets an actual requirement.

With reference to the fourth implementation of the first aspect, in a fifth implementation of the first aspect of embodiments of this disclosure, the Bluetooth master device may obtain the service requirement feature from the outside or from the inside. The obtaining from the outside may include: The Bluetooth master device receives a service requirement feature from a user; alternatively the Bluetooth master device receives the service requirement feature from indicating equipment. The obtaining from the inside may include: The Bluetooth master device determines or generates the service requirement feature based on the target service.

In this embodiment, the Bluetooth master device may obtain the service requirement feature from the outside or from the inside, and there are various ways to obtain the service requirement feature. This improves flexibility and implementability of the solution.

With reference to any one of the first aspect, or the first implementation to the fifth implementation of the first aspect of embodiments of this disclosure, in a sixth implementation of the first aspect of embodiments of this disclosure, there are a plurality of Bluetooth slave devices, the Bluetooth master device separately establishes the CIS link with the plurality of Bluetooth slave devices, and a plurality of CIS links between the Bluetooth master device and the plurality of Bluetooth slave devices are included in a connected isochronous stream group (CIG). The CIG may further include a time sequence relationship for performing data transmission on the plurality of CIS links, and/or a respective link parameter of the plurality of CIS links. That the Bluetooth master device generates the group of CIS link adjustment parameters for each Bluetooth slave device based on the service requirement feature may specifically include: The Bluetooth master device generates the group of CIS link adjustment parameters for each of the plurality of Bluetooth slave devices based on the service requirement feature, the time sequence relationship for performing data transmission on the plurality of CIS links, and/or the respective link parameter of the plurality of CIS links.

In this embodiment, the CIG may include the plurality of CIS links. If one of the CIS links needs to be adjusted, a data receiving and sending time point of the CIS link changes. This affects a time point at which data receiving and sending are performed on another CIS link in the CIG. Therefore, the group of CIS link adjustment parameters is generated for each of the plurality of Bluetooth slave devices with reference to the time sequence relationship for performing data transmission on the plurality of CIS links, and/or the respective link parameter of the plurality of CIS links. The Bluetooth master device may use the CIG as a whole, based on an adjustment on the receiving and sending a time point or a duration of the at least one of CIS links, with reference to the time sequence relationship for performing data receiving and sending on the plurality of CIS links in the CIG, and adaptively adjust a receiving and sending time point of another CIS link in the CIG. Therefore, it is ensured that an adjusted data receiving and sending time sequence do not conflict with each other between the CIS links in a same CIG, and integrity, timeliness, reliability, or accuracy of data transmission performed by the adjusted CIS link are ensured.

With reference to any one of the fourth implementation to the sixth implementation of the first aspect of embodiments of this disclosure, in a seventh implementation of the first aspect of embodiments of this disclosure, the service requirement feature may indicate an adjustment on data transmitted on the CIS link, and may specifically indicate that the data transmitted on the CIS link is adjusted from data of an initial service to data of the target service. In this case, that the Bluetooth master device generates the group of CIS link adjustment parameters for each Bluetooth slave device may specifically include: generating, for each Bluetooth slave device, a group of CIS link adjustment parameters needed to transmit the data of the target service.

In this embodiment, the service requirement feature indicates the adjustment requirement for the CIS link caused by a change of the service data caused by service switching. Therefore, when the service changes, the CIS link may be adjusted in a timely and accurate manner based on a transmission requirement of the service data by using the service requirement feature, and the data transmission is not interrupted. This ensures the timeliness and the accuracy of the data transmission.

With reference to any one of the fourth implementation to the sixth implementation of the first aspect of embodiments of this disclosure, in an eighth implementation of the first aspect of embodiments of this disclosure, the service requirement feature indicates to enhance received signal quality or an anti-interference capability of the CIS link. In this case, that the Bluetooth master device generates the group of CIS link adjustment parameters for each Bluetooth slave device may specifically include: The Bluetooth master device generates, for each Bluetooth slave device, a group of CIS link adjustment parameters for enhancing the signal receiving quality of the CIS link.

With reference to the eighth implementation of the first aspect, in a ninth implementation of the first aspect of embodiments of this disclosure, the CIS link may be adjusted based on a communication environment. Specifically, the Bluetooth master device may obtain a service requirement feature corresponding to the communication interference.

The communication interference may be determined in the following manner: determining based on any one of a channel scanning result, a receiving and sending success rate, or signal strength. For example, when the channel scanning result, the receiving and sending success rate, or the signal strength is less than or equal to a threshold, it is determined that the communication interference is strong; otherwise, it is determined that the communication interference is weak.

If the communication interference is strong, the service requirement feature and the CIS link adjustment parameter are used to enhance the received signal quality of the CIS link. Received signal quality of an adjusted CIS link is higher than the received signal quality of the CIS link before the adjustment.

If the communication interference is weak, the service requirement feature and the CIS link adjustment parameter are used to increase the transmission rate of the CIS link. A transmission rate of the adjusted CIS link is greater than the transmission rate of the CIS link before the adjustment.

In this embodiment, the CIS link is adjusted based on the communication environment. The received signal quality of the CIS link is improved when the communication interference is strong. This ensures the integrity and the reliability of the data transmission. The transmission rate of the CIS link is increased when the communication interference is weak. This fully utilizes a bandwidth resource while ensuring data transmission quality, and improves a data transmission speed.

In this embodiment, any one or more of the foregoing parameters may be detected in real time, to determine the communication interference situation in real time based on the foregoing parameters, to adjust the CIS link in real time, and implement adaptive adjustment on the CIS link for a changed communication environment.

With reference to the sixth implementation of the first aspect of embodiments of this disclosure, in a tenth implementation of the first aspect of embodiments of this disclosure, the service requirement feature indicates an adjustment on a data path of at least one CIS link in the CIG, and may specifically indicate that the data path of the at least one CIS link in the CIG is adjusted from a data path corresponding to the initial service to a target data path corresponding to the target service. The data path indicates an uplink state/a downlink state of the CIS link. The target data path indicates the uplink/downlink state of the CIS link corresponding to a case in which the CIS link corresponds to the target service. In this case, that the Bluetooth master device generates the group of CIS link adjustment parameters for each Bluetooth slave device may specifically include: The Bluetooth master device generates, for each of the plurality of Bluetooth slave devices, a group of CIS link adjustment parameters corresponding to the target data path.

In this embodiment, when the data path of the CIS link needs to change, the CIS link adjustment parameter is determined based on a service requirement feature of an adjustment requirement of the data path, and the CIS link is adjusted based on the CIS link adjustment parameter, to adjust the data path of the CIS link.

In addition, the CIS link adjustment parameter may be further determined based on a receiving and sending time sequence of the CIS link in the CIG, so that it is ensured that the adjusted data receiving and sending time sequence of the CIS link in the CIG does not conflict with each other, and the integrity, the timeliness, the reliability, or the accuracy of the data transmission performed by the adjusted CIS link are ensured.

With reference to any one of the first aspect, or the first implementation to the tenth implementation of the first aspect, in an eleventh implementation of the first aspect of embodiments of this disclosure, whether to adjust the CIS link may be determined based on the communication state of the Bluetooth slave device. Specifically, after the link update message is sent to the Bluetooth slave device:

The Bluetooth master device disconnects the CIS link with the target Bluetooth slave device if the Bluetooth master device receives a rejection response from a target Bluetooth slave device. The rejection response indicates that the target Bluetooth slave device is in an engaged state, that is, a communication resource of the target Bluetooth slave device is occupied and cannot transmit data to the Bluetooth master device.

If the Bluetooth master device does not receive the rejection response from the Bluetooth slave device, the Bluetooth master device adjusts the CIS link at an adjustment moment based on a target link parameter and the synchronization moment identifier.

In this embodiment, if the communication resource of the target Bluetooth slave device is occupied and the target Bluetooth slave device cannot transmit the data to the Bluetooth master device, the Bluetooth master device may receive the rejection response, and disconnect the CIS link with the target Bluetooth slave device based on the rejection response. In this way, the bandwidth resource occupied by the CIS link between the Bluetooth master device and the target Bluetooth slave device is released, a waste of bandwidth resources is reduced, and a bandwidth resource utilization rate is increased.

With reference to any one of the second implementation to the eleventh implementation of the first aspect, in a twelfth implementation of the first aspect of embodiments of this disclosure, the target link parameter is used to adjust the transmission rate of the CIS link, and the target link parameter may include at least one of target transmission bandwidth, a target uplink transmission time, a target downlink transmission time, a target uplink transmission data packet length, a target downlink transmission data packet length, target uplink physical transmission bandwidth and a modulation scheme, target downlink physical transmission bandwidth and a modulation scheme and a target uplink/downlink synchronization moment.

In this embodiment, the target link parameter may specifically be at least one of the plurality of parameters, and a specific parameter or specific parameters that constitute the target link parameter may be flexibly set. This improves flexibility and implementability of the solution.

A second aspect of embodiments of this disclosure provides a CIS link adjustment method. The method includes:

If a Bluetooth master device establishes a CIS link with a Bluetooth slave device, and the Bluetooth slave device may transmit service data to the Bluetooth master device on the CIS link. The Bluetooth slave device may receive a group of CIS link adjustment parameters from the Bluetooth master device. The group of CIS link adjustment parameters may be generated based on a target service. After the group of CIS link adjustment parameters is obtained, the Bluetooth slave device may adjust the CIS link based on the group of CIS link adjustment parameters.

For beneficial effects of the second aspect of embodiments of this disclosure, refer to the first aspect.

With reference to the second aspect, in a first implementation of the second aspect of embodiments of this disclosure, the Bluetooth slave device may receive the CIS link adjustment parameter by using a link update message.

Specifically, the Bluetooth slave device may receive, from the Bluetooth master device, the link update message including the CIS link adjustment parameter corresponding to the Bluetooth slave device.

With reference to the second aspect or the first implementation of the second aspect of embodiments of this disclosure, in a second implementation of the second aspect of embodiments of this disclosure, the CIS link adjustment parameter may include a target link parameter, a synchronization moment identifier, and a target adjustment moment, the target link parameter and the synchronization moment identifier are used to adjust the CIS link, and the target adjustment moment indicates a moment for adjusting the CIS link. To be specific, the Bluetooth master device may adjust, based on the target link parameter and the synchronization moment identifier at the time point indicated by the target adjustment moment or at the target adjustment moment, a CIS link corresponding to the target adjustment moment.

With reference to any one of the second aspect, or the first implementation or the second implementation of the second aspect of embodiments of this disclosure, in a third implementation of the second aspect of embodiments of this disclosure, an adjustment on the CIS link may specifically be an adjustment on a transmission rate of the CIS link.

With reference to any one of the second aspect, or the first implementation to the third implementation of the second aspect of embodiments of this disclosure, in a fourth implementation of the second aspect of embodiments of this disclosure, the group of CIS link adjustment parameters may be generated based on a service requirement feature of the target service. The service requirement feature may indicate an adjustment requirement for at least one of the CIS link, a rate of the CIS link, real-time performance of the CIS link, and an anti-interference capability of the CIS link.

With reference to the fourth implementation of the second aspect, in a fifth implementation of the second aspect of embodiments of this disclosure, the service requirement feature may be obtained by the Bluetooth master device from the outside or from the inside. The obtaining from the outside may include: The Bluetooth master device receives a service requirement feature from a user; alternatively the Bluetooth master device receives a service requirement feature from indicating equipment. The obtaining from the inside may include: The Bluetooth master device determines or generates the service requirement feature based on the target service.

With reference to any one of the second aspect, or the first implementation to the fifth implementation of the second aspect of embodiments of this disclosure, in a sixth implementation of the second aspect of embodiments of this disclosure, there may be a plurality of Bluetooth slave devices, the Bluetooth master device separately establishes the CIS link with the plurality of Bluetooth slave devices, and a plurality of CIS links between the Bluetooth master device and the plurality of Bluetooth slave devices are included in a connected isochronous stream group (CIG). The CIG may further include a time sequence relationship for performing data transmission on the plurality of CIS links, and/or a respective link parameter of the plurality of CIS links. The group of CIS link adjustment parameters may be generated by the Bluetooth master device based on the service requirement feature, the time sequence relationship of performing data transmission on the plurality of CIS links, and/or the respective link parameter of the plurality of CIS links.

With reference to any one of the fourth implementation to the sixth implementation of the second aspect of embodiments of this disclosure, in a seventh implementation of the second aspect of embodiments of this disclosure, the service requirement feature may indicate an adjustment on data transmitted on the CIS link, and may specifically indicate that the data transmitted on the CIS link is adjusted from data of an initial service to data of the target service. In this case, the group of CIS link adjustment parameters may include a group of CIS link adjustment parameters needed to transmit the data of the target service.

With reference to any one of the fourth implementation to the sixth implementation of the second aspect of embodiments of this disclosure, in an eighth implementation of the second aspect of embodiments of this disclosure, the service requirement feature indicates to enhance received signal quality or the anti-interference capability of the CIS link. In this case, the group of CIS link adjustment parameters includes a group of CIS link adjustment parameters for enhancing the signal receiving quality of the CIS link.

With reference to the eighth implementation of the second aspect, in a ninth implementation of the second aspect of embodiments of this disclosure, the CIS link may be adjusted based on a communication environment. Specifically, the service requirement feature may be obtained by the Bluetooth master device based on a communication interference.

With reference to the sixth implementation of the first aspect of embodiments of this disclosure, in a tenth implementation of the first aspect of embodiments of this disclosure, the service requirement feature indicates an adjustment on a data path of at least one CIS link in the CIG, and may specifically indicate that the data path of the at least one CIS link in the CIG is adjusted from a data path corresponding to the initial service to a target data path corresponding to the target service. The data path indicates an uplink state/a downlink state of the CIS link. The target data path indicates the uplink/downlink state of the CIS link corresponding to a case in which the CIS link corresponds to the target service. In this case, the group of CIS link adjustment parameters includes a group of CIS link adjustment parameters corresponding to the target data path.

With reference to any one of the second aspect, or the first implementation to the tenth implementation of the second aspect, in an eleventh implementation of the second aspect of embodiments of this disclosure, whether to adjust the CIS link may be determined based on a communication state of the Bluetooth slave device. Specifically, after the Bluetooth slave device receives the group of CIS link adjustment parameters from the Bluetooth master device, the method may further include: The Bluetooth slave device sends a rejection response to the Bluetooth master device if the Bluetooth slave device is in an engaged state. The rejection response is used to disconnect the CIS link with the Bluetooth master device. The Bluetooth slave device disconnects the CIS link.

With reference to any one of the second implementation to the eleventh implementation of the second aspect, in a twelfth implementation of the second aspect of embodiments of this disclosure, the target link parameter is used to adjust a transmission rate of the CIS link, and the target link parameter may specifically include at least one of target transmission bandwidth, a target uplink transmission time, a target downlink transmission time, a target uplink transmission data packet length, a target downlink transmission data packet length, target uplink physical transmission bandwidth and a modulation scheme, target downlink physical transmission bandwidth and a modulation scheme and a target uplink/downlink synchronization moment.

A third aspect of embodiments of this disclosure provides a Bluetooth master device, and the Bluetooth master device includes:

a processor and a transceiver.

The Bluetooth master device separately establishes a CIS link with at least one Bluetooth slave device;

the processor is configured to generate a group of CIS link adjustment parameters for each Bluetooth slave device based on a target service;

the transceiver is configured to send the corresponding CIS link adjustment parameter to each Bluetooth slave device, to indicate each Bluetooth slave device to dynamically adjust the CIS link based on the corresponding CIS link adjustment parameter;

the processor is further configured to adjust the CIS link; and the transceiver is further configured to perform data transmission of the target service with at least one Bluetooth device based on an adjusted CIS link.

The Bluetooth master device is configured to implement the method according to the first aspect.

With reference to the third aspect, in an optional implementation of the third aspect of embodiments of this disclosure, the Bluetooth master device may be a device form such as a Bluetooth headset, a Bluetooth chip, or a Bluetooth sound box. This is not limited herein.

A fourth aspect of embodiments of this disclosure provides a Bluetooth slave device, and the Bluetooth slave device includes:

a processor and a transceiver.

The Bluetooth slave device establishes a CIS link with a Bluetooth master device;

the transceiver is configured to receive a group of CIS link adjustment parameters from the Bluetooth master device. The group of CIS link adjustment parameters is generated based on a target service.

The processor is configured to adjust the CIS link based on the group of CIS link adjustment parameters.

The Bluetooth slave device is configured to implement the method according to the second aspect.

With reference to the fourth aspect, in an optional implementation of the fourth aspect of embodiments of this disclosure, the Bluetooth slave device may be a device form such as a Bluetooth headset, a Bluetooth chip, or a Bluetooth sound box. This is not limited herein.

A fifth aspect of embodiments of this disclosure provides a computer-readable storage medium. The computer-readable storage medium stores a program, and when a computer executes the program, the method according to the first aspect or the second aspect is performed.

A sixth aspect of embodiments of this disclosure provides a computer program product, and when the computer program product runs on a computer, the computer performs the method in the first aspect or the second aspect.

A seventh aspect of embodiments of this disclosure provides a chip system. The chip system includes at least one processor and a communication interface. The communication interface and the at least one processor are interconnected through a line. The at least one processor is configured to run a computer program or instructions, to perform the CIS link adjustment method described according to any one of the possible implementations of the first aspect or the second aspect.

The communication interface in the chip may be an input/output interface, a pin, a circuit, or the like.

In a possible implementation, the chip system described in this disclosure further includes at least one memory, and the at least one memory stores the instructions. The memory may be a storage unit inside the chip, for example, a register or a cache, or may be a storage unit (for example, a read-only memory or a random access memory) of the chip.

BRIEF DESCRIPTION OF DRAWINGS

FIG. 6a is a schematic diagram of a CIS link according to an embodiment of this disclosure;

FIG. 6b is another communication time sequence diagram of a CIS link adjustment method according to an embodiment of this disclosure;

FIG. 9 is yet still another schematic flowchart of a CIS link adjustment method according to an embodiment of this disclosure;

FIG. 10 is still yet another communication time sequence diagram of a CIS link adjustment method according to an embodiment of this disclosure;

DESCRIPTION OF EMBODIMENTS

Embodiments of this disclosure provide a CIS link adjustment method and a related device, to adjust a CIS link based on a target service, so that data transmission is not interrupted in a link adjustment process, to improve smoothness and reliability of the data transmission.

Figure 1:
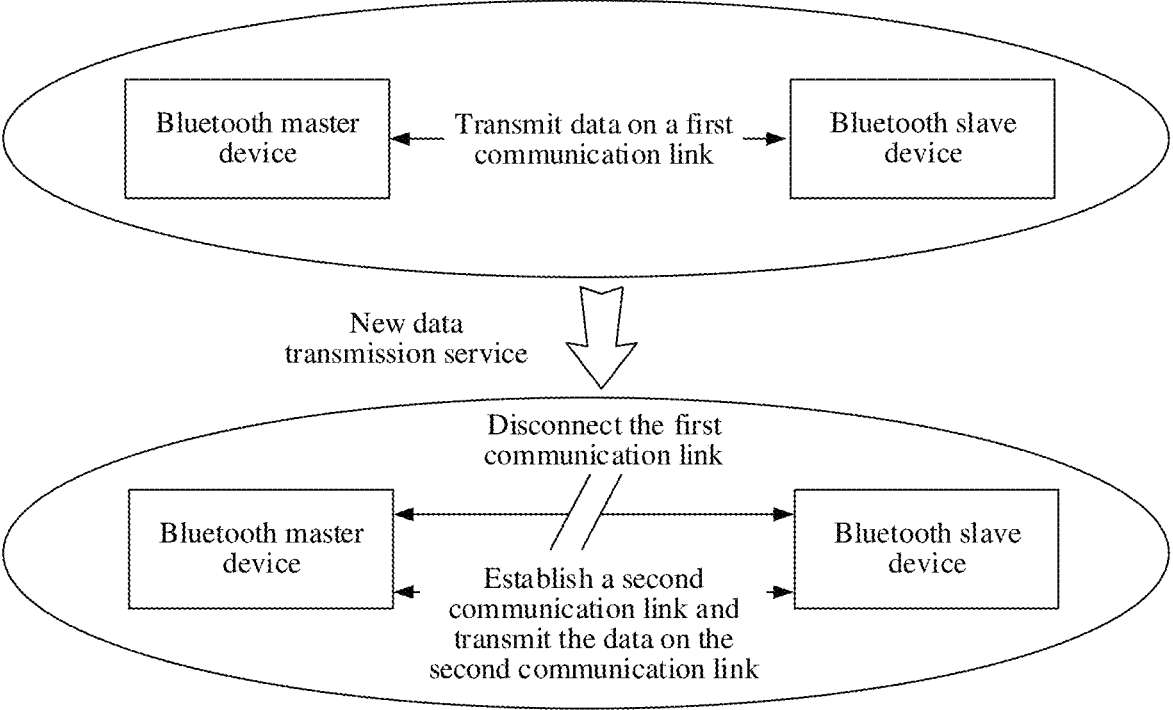
FIG. 1 is a schematic flowchart of a link change method.

FIG. 1 is a schematic flowchart of a link change method. As shown in FIG. 1, a Bluetooth master device and a Bluetooth slave device transmit data through a first communication link. When a data transmission service changes, an original first communication link needs to be disconnected, and a second communication link needs to be established for a new data transmission service, to transmit the data through the second communication link.

In a process of disconnecting the first communication link and establishing the second communication link, the data cannot be transmitted between the Bluetooth master device and the Bluetooth slave device. In this case, each time the data transmission service changes, the data transmission is interrupted due to the disconnection and re-establishment of the communication link, and the data cannot be transmitted in time.

A Bluetooth communication technology includes a connected isochronous stream (CIS) technology. To resolve a defect of the foregoing data transmission interruption occurring in a CIS link, an embodiment of this disclosure provides a CIS link adjustment method. A Bluetooth master device sends a CIS link adjustment parameter to a Bluetooth slave device, and adjusts a communication link based on the CIS link adjustment parameter, so that the CIS link is adjusted in a data transmission process. Therefore, the CIS link is adjusted without interrupting data transmission, to adapt to a new data transmission service. In this embodiment, the new data transmission service is also referred to as a target service. This is not limited herein.

In this embodiment, a data transmission requirement is also referred to as a service requirement feature, and indicates an adjustment requirement that is corresponding to the target service and that is for the CIS link or a rate of the CIS link. In this embodiment, in addition to the CIS link or the rate of the CIS link, the adjustment requirement reflected by the service requirement feature may be for another parameter, for example, real-time performance of the CIS link or an anti-interference capability of the CIS link. This is not limited herein.

Figure 2:
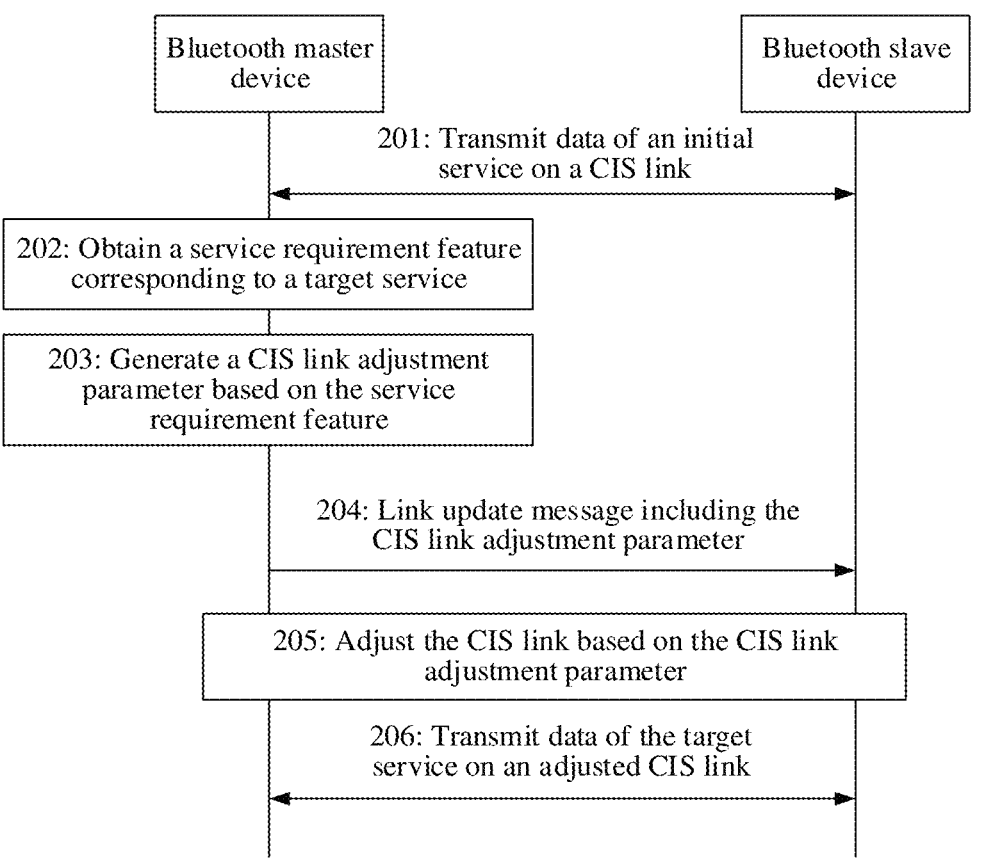
FIG. 2 is a schematic flowchart of a CIS link adjustment method according to an embodiment of this disclosure.

FIG. 2 is a schematic flowchart of a CIS link adjustment method according to an embodiment of this disclosure. The method includes the following steps.

201: A Bluetooth master device transmits data of an initial service to a Bluetooth slave device on a CIS link.

The CIS link is established between the Bluetooth master device and the Bluetooth slave device. In this case, the CIS link is used to transmit the data corresponding to the initial service. In this case, the Bluetooth master device may transmit the data of the initial service to the Bluetooth slave device on the CIS link.

In this embodiment, the data of the initial service may be audio data. In addition to the audio data, the data of the initial service may alternatively be other data, for example, image data and video data. This is not limited herein.

202: The Bluetooth master device obtains a service requirement feature corresponding to a target service.

When a service corresponding to the data transmitted on the CIS link changes and has changed to the target service, the Bluetooth master device may obtain the service requirement feature corresponding to the target service.

The target service may be a music playback task. In addition to the music playback task, the target service may alternatively be another service, for example, a sound recording service, a call service, music playback/sound recording/call with a high anti-interference capability, high-rate music playback/sound recording/call, or low-rate music playback/sound recording/call. This is not limited herein.

In this embodiment, an action of obtaining the service requirement feature may occur in another case, for example, when the service corresponding to the data transmitted on the CIS link is to change, or when the CIS link needs to be adjusted based on the target service. This is not limited herein.

Specifically, the Bluetooth master device may obtain the service requirement feature from the inside or from the outside.

The obtaining the service requirement feature from the outside may include receiving instructions from a user that include the service requirement feature. In addition to receiving the instructions from the user, the Bluetooth master device may obtain the service requirement feature in another manner of obtaining from the outside, for example, obtain the service requirement feature from indicating equipment. This is not limited herein.

For example, the obtaining from the inside may include: The Bluetooth master device determines the service requirement feature based on the target service. A manner of obtaining the target service is not limited, and the target service may be obtained from the outside or from the inside. A manner of obtaining from the outside is similar to the manner of obtaining the service requirement feature from the outside. The obtaining the target service from the inside may include: The Bluetooth master device determines the target service based on a change of a communication environment. In addition to the change of the communication environment, the target service may be generated or determined based on another factor, for example, based on a communication state of the Bluetooth slave device. This is not limited herein.

For example, an example of obtaining the target service from the inside may include: The Bluetooth master device detects the communication environment, and when a detection result of the communication environment shows that communication interference in the environment is strong, an anti-interference capability of the CIS link needs to be improved. If a service being performed on the CIS link in this case is a music playback service, it may be determined that the target service is a music playback service with a high anti-interference capability.

203: The Bluetooth master device generates the CIS link adjustment parameter based on the service requirement feature.

The Bluetooth master device may determine, based on the service requirement feature, the CIS link adjustment parameter corresponding to the service requirement feature.

The CIS link adjustment parameter may include a target link parameter. In addition to the target link parameter, the CIS link adjustment parameter may further include another parameter such as a synchronization moment identifier and a target adjustment moment. This is not limited herein. The target link parameter and the synchronization moment identifier indicate to adjust a transmission rate of the CIS link, and the target adjustment moment indicates a moment for adjusting the CIS link.

In this embodiment, the transmission rate of the CIS link may also be referred to as a rate of the CIS link. This is not limited herein.

In this embodiment, in addition to the transmission rate of the CIS link, the service requirement feature may further indicate to adjust another parameter, for example, the CIS link, real-time performance of the CIS link, or an anti-interference capability of the CIS link. This is not limited herein.

Optionally, a process of generating the CIS link adjustment parameter may be as follows: The Bluetooth master device determines the target link parameter based on the service requirement feature, and then determines the synchronization moment identifier and the target adjustment moment based on the target link parameter and synchronization information of a current CIS link. In addition to the foregoing manner, the Bluetooth master device may alternatively determine the target link parameter, the synchronization moment identifier, and the target adjustment moment in another manner, for example, determine the target link parameter, the synchronization moment identifier, and the target adjustment moment directly based on the service requirement feature. This is not limited herein.

On the CIS link, receiving and sending time of air interface data may determine important factors such as the transmission rate and uplink/downlink bandwidth of the CIS link. Therefore, in the present invention, the CIS link is adjusted mainly by adjusting the receiving and sending time of the air interface data. In addition to adjusting the receiving and sending time of the air interface data, the present invention may alternatively adjust the CIS link by adjusting another parameter, for example, a frequency band of a communication link and a physical modulation scheme. This is not limited herein.

In this embodiment, the receiving and sending time of the air interface data may include a target uplink/downlink synchronization moment. This is not limited herein.

Figure 3:
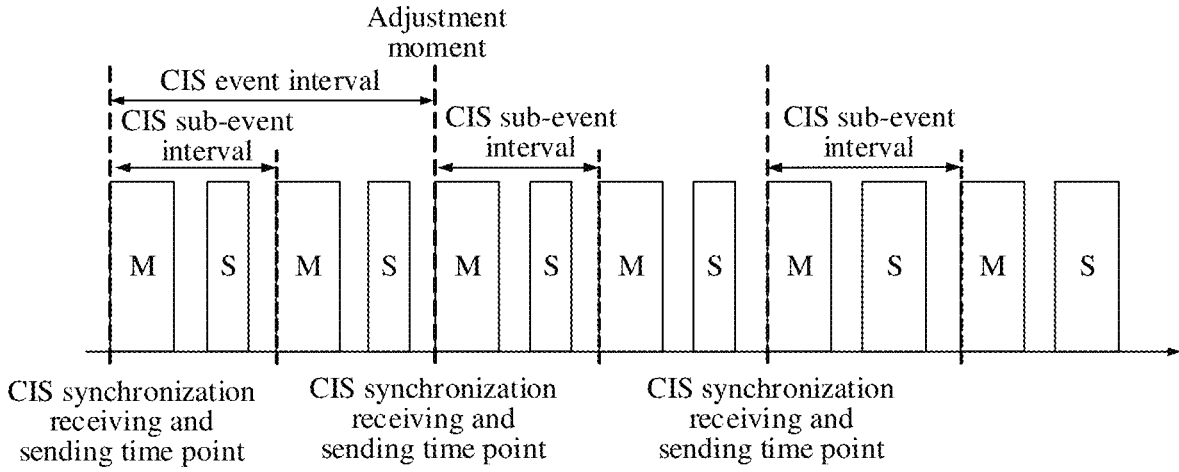
FIG. 3 is a communication time sequence diagram of a CIS link adjustment method according to an embodiment of this disclosure.

In other words, the target uplink/downlink synchronization moment, the frequency band of the communications link, and the physical modulation scheme all may be used as the target link parameter. The target link parameter may further include another type of parameter. To describe functions of various target link parameters in detail, a data transmission mechanism of the CIS link needs to be described first. Therefore, the following describes the data transmission mechanism of the CIS link and an adjustment on the CIS link with reference to a communication time sequence diagram. FIG. 3 is a communication time sequence diagram of a link adjustment method according to an embodiment of this disclosure.

With reference to FIG. 3, the following describes in detail parameters in embodiments of this disclosure from three aspects: a relationship between devices, a way of data transmission on a CIS link, and parameters that affect the data transmission.

(1) Relationship Between the Devices

M in the figure represents a master, to be specific, a main control party of the data transmission, and is also referred to as the Bluetooth master device in embodiments of this application. S in the figure represents a slave, that is, a slave party of the data transmission, and is also referred to as the Bluetooth slave device in embodiments of this disclosure. There may be one or more Bluetooth slave devices. This is not limited herein.

The CIS link is established between the Bluetooth master device and the Bluetooth slave device. The CIS link is used to transmit the data between the Bluetooth master device and the Bluetooth slave device. The Bluetooth master device may adjust the CIS link, and the Bluetooth slave device may assist the Bluetooth master device to adjust the CIS link.

As shown in FIG. 3, a horizontal coordinate in the figure is time, a rectangular box marked with M represents downlink data sent by the Bluetooth master device to the Bluetooth slave device, and a rectangular box marked with S represents uplink data sent by the Bluetooth slave device to the Bluetooth master device.

(2) Way of the Data Transmission on the CIS Link

In a Bluetooth communication system, when a transmitting end sends data, a receiving end needs to enable a data receiving path to the transmitting end, to implement data receiving. Therefore, in the Bluetooth communication system, the data needs to be received and sent based on a synchronization receiving and sending time point. However, in a CIS technology, the data is transmitted in a unit of a CIS event. One CIS event interval is between two CIS event synchronization receiving and sending time points, and one CIS event interval is used to complete one CIS event. One CIS event includes one or more CIS sub-events, and one CIS sub-event indicates one time of data receiving or sending. As shown in a time sequence diagram in first two CIS event intervals in FIG. 3, in a CIS system, a CIS event is periodically performed by using the CIS event interval as a period, to transmit the data by using the CIS sub-event in the CIS event.

Data transmission on the CIS link needs to be performed based on a service requirement corresponding to a service, and the service requirement may include a transmission mode of uplink/downlink data. The Bluetooth master device may determine a data packet length of the uplink data and a data packet length of the downlink data based on the transmission mode of the uplink/downlink data, to determine a CIS event interval and a CIS sub-event interval.

Optionally, in addition to the transmission mode of the uplink/downlink data, the service requirement may further include another parameter, for example, the data packet length of the uplink data and the data packet length of the downlink data. This is not limited herein. The Bluetooth master device may directly determine the CIS event interval and the CIS sub-event interval based on the data packet length of the uplink data and the data packet length of the downlink data. For example, when a communication requirement is that the downlink data needs to be continuously transmitted and the uplink data does not need to be transmitted, and the packet length of the downlink data is needed to be not less than 5 bytes, it needs to be ensured that in each CIS sub-event, downlink bandwidth is greater than or equal to 5 bytes, and uplink bandwidth may be 0.

In addition to the transmission mode of the uplink/downlink data, the data packet length of the uplink data, and the data packet length of the downlink data, the service requirement may further include other content, for example, whether to perform framing on the data. This is not limited herein.

In this embodiment, the service requirement is also referred to as the service requirement feature, that is, the service requirement feature obtained in step 202.

After the service requirement feature is obtained, the synchronization receiving and sending time point, that is, a data receiving and sending time point of each CIS sub-event, needs to be determined based on the service requirement feature. Because the data is transmitted in the unit of the CIS event, all data receiving and sending time points may be determined after a data receiving and sending time point of each CIS sub-event in one CIS event is determined.

On the CIS link, the synchronization receiving and sending time point is determined by the CIS sub-event interval. Therefore, a corresponding CIS sub-event interval needs to be determined based on the data packet length of the uplink data and the data packet length of the downlink data.

In addition to the CIS sub-event interval, another parameter may be determined based on the service requirement feature, for example, a physical modulation scheme and a maximum quantity of interaction times in one CIS event. This is not limited herein.

When CIS sub-event intervals are the same, the physical modulation scheme may affect a volume of data that can be transmitted in the CIS sub-event, that is, may affect the transmission rate of the CIS link. The maximum quantity of interaction times (NSE) is determined by the CIS event interval and the CIS sub-event interval. It needs to be ensured that a product of the NSE and the CIS sub-event interval is not greater than the CIS event interval. Otherwise, CIS sub-events overlap and the data cannot be transmitted normally.

(3) Parameters that Affect the Data Transmission on the CIS Link

It can be learned from the foregoing descriptions of the data transmission on the CIS link that the data transmission on the CIS link is affected by the parameters such as the physical modulation scheme, the data packet length of the uplink data, the data packet length of the downlink data, whether framing is performed, the NSE, and the CIS sub-event interval. To adjust the CIS link, the CIS link needs to be adjusted based on one or some of these parameters. Therefore, these parameters may be collectively referred to as the CIS link adjustment parameter.

204: The Bluetooth master device sends, to the Bluetooth slave device, a link update message including the CIS link adjustment parameter.

The CIS link adjustment parameter is determined, and the Bluetooth master device may send the link update message to the Bluetooth slave device. The message carries the CIS link adjustment parameter. The CIS link adjustment parameter is used to adjust the CIS link by the Bluetooth slave device.

Specifically, when the CIS link adjustment parameter carried in the message includes the target link parameter, the synchronization moment identifier, and the target adjustment moment, the link update message may be used by the Bluetooth slave device to adjust a transmission rate of a first CIS link at the target adjustment moment based on the target link parameter and the synchronization moment identifier.

The following describes the target link parameter in detail with reference to FIG. 3 and Table 1.

In this embodiment, the link update message is also referred to as CIS_CHANGE_IND. For example, a message format of the link update message may be shown in Table 1.

TABLE 1

| Message format of a link update message | | |
| --- | --- | --- |
| Name | Byte Count | Definition |
| CIG_ID | 1 byte | CIG serial number |
| Phy_M_to_S | 1 byte | Physical modulation scheme (Master to Slave) |
| Phy_S_to_M | 1 byte | Physical modulation scheme (Master to Slave) |
| Max_SDU_ M_to_S | 12 bits | Maximum packet length exchanged with a BTH (Master to Slave) |
| Framed | 1 bit | Whether framing is performed |
| rfu | 3 bits | Not defined |
| Max_SDU_ S_to_M | 12 bits | Maximum packet length exchanged with the BTH (Master to Slave) |
| rfu | 4 bits | Not defined |
| Max_PDU_ M_to_S | 8 bits | Maximum packet length of an air interface (Master to Slave, in bytes) |
| Max_PDU_ S_to_M | 8 bits | Maximum packet length of the air interface (Master to Slave, in bytes) |
| NSE | 1 byte | Maximum quantity of interaction times |
| Sub_interval | 3 bytes | Sub-event interval (in milliseconds) |
| CIS_ch_offset | 3 bytes | Offset of an update point (in milliseconds) |
| CIG_Sync_ delay | 3 bytes | CIG synchronization delay (in milliseconds) |
| CIS_Sync_ delay | 3 bytes | Current CIS synchronization delay (in milliseconds) |
| Ref_counter | 2 bytes | Update event counter point (in times) |

CIG_ID indicates an identifier number of a CIG event, CIS_ID indicates an identifier number of the CIS event in a CIG event to which the CIS event belongs, and CIS events between a plurality of slave parties and the main control party form one CIG event. For detailed descriptions of the CIG event, refer to embodiments in FIG. 5 to FIG. 7.

As shown in Table 1, Phy_M_to_S represents the physical modulation scheme of the downlink data from the main control party to the slave party, which is also referred to as target downlink physical transmission bandwidth and a modulation scheme; and Phy_S_to_M represents the physical modulation scheme of the uplink data from the slave party to the main control party, which is also referred to as target uplink physical transmission bandwidth and a modulation scheme.

Max_SDU_M_to_S represents a maximum packet length of a data packet from an upper layer from the main control party to the slave party, that is, a maximum packet length of a downlink data packet from the upper layer, that is, a maximum packet length of a downlink data packet from a Bluetooth control (btc) layer. Framed represents whether the data packet is framed, to be specific, whether a Bluetooth uplink/downlink data packet includes a plurality of user service data packets. rfu is an undefined parameter, for extending content included in the message. Max_SDU_S_to_M represents a maximum packet length of a data packet from an upper layer from the slave party to the main control party, that is, a maximum packet length of an uplink data packet from the upper layer, that is, a maximum packet length of an uplink data packet from the Bluetooth control (btc) layer.

Max_PDU_M_to_S represents a maximum packet length of air interface data from a current layer from the main control party to the slave party, that is, a maximum packet length of downlink air interface data from the current layer, that is, a maximum packet length of the downlink air interface data from the Bluetooth host (bth) layer. Max_PDU_S_to_M represents a maximum packet length of the air interface data from the current layer from the slave party to the main control party, that is, a maximum packet length of uplink air interface data from the current layer, that is, a maximum packet length of the uplink air interface data from the Bluetooth host (bth) layer. In this embodiment, Max_PDU_M_to_S is also referred to as a target downlink transmission data packet length, Max_PDU_S_to_M is also referred to as a target uplink transmission data packet length, and Max_PDU_M_to_S and Max_PDU_S_to_M are referred to as target transmission bandwidth.

NSE represents the maximum quantity of interaction times, to be specific, an upper limit of a quantity of CIS sub-events that can be included in one CIS event. Sub_interval represents a signal CIS sub-event time interval.

The foregoing parameters represent a state of an adjusted CIS link. Because data receiving and sending on the CIS link need to be performed strictly based on a time sequence agreed on between the main control party and the slave party, a common adjustment moment also needs to be agreed on for adjusting the CIS link.

In this embodiment, Ref_counter represents an adjustment moment, to be specific, a moment at which the Bluetooth master device and the Bluetooth slave device start to adjust the first CIS link. CIS_ch_offset represents the offset of the update point relative to the adjustment moment. The update point is Ref_counter_clock (local device time corresponding to Ref_counter)+CIS_ch_offset. CIG_Sync_delay represents an overall transmission delay of the CIG event. CIS_Sync_delay represents a transmission delay of the CIS link.

In this embodiment, CIS_ch_offset and Sub_interval are also referred to as the synchronization moment identifier, and are used to determine a synchronization moment of an adjusted first CIS link, that is, the target uplink/downlink synchronization moment. In addition to the adjustment moment and the synchronization moment identifier, remaining data in the table is the target link parameter, and represents each parameter of the adjusted first CIS link.

Sub_interval includes transmission time of an uplink CIS sub-event and transmission time of a downlink CIS sub-event. In this embodiment, the transmission time of the uplink CIS sub-event is also referred to as target uplink transmission time, and the transmission time of the downlink CIS sub-event is also referred to as target downlink transmission time.

205: The Bluetooth master device and the Bluetooth slave device adjust the CIS link based on the CIS link adjustment parameter.

Both the Bluetooth master device and the Bluetooth slave device obtain the CIS link adjustment parameter. In this case, the Bluetooth master device and the Bluetooth slave device may adjust the CIS link based on the CIS link adjustment parameter, so that an adjusted CIS link may be used to transmit the service data of the target service.

As shown in FIG. 3, after the target adjustment moment, the Bluetooth master device and the Bluetooth slave device start to adjust the CIS link. Specifically, the update time point is calculated based on CIS_ch_offset in CIS_CHANGE_IND after the adjustment moment.

For example, the update time point may be a start time point of an $n^{th}$ CIS event after the adjustment moment. n is any positive integer, for example, 1 or 2. This is not limited herein. After the update time point is determined, uplink/downlink data receiving and sending time points of each CIS sub-event are determined based on Sub_interval after the update time point, to adjust the CIS link, and adjust the transmission rate of the CIS link.

As shown in FIG. 3, in a $3^{rd}$ CIS event interval after the adjustment moment, the CIS link is adjusted, and a CIS sub-event interval allocated to the uplink data becomes longer. It is represented in the figure that the rectangular box marked with S becomes wider, and a transmission rate of the uplink data is increased.

It should be noted that, in addition to CIS_ch_offset and Sub_interval, the Bluetooth master device and the Bluetooth slave device may alternatively adjust the CIS link based on another target link parameter. This is not limited herein.

206: The Bluetooth master device transmits the data of the target service to the Bluetooth slave device on the adjusted CIS link.

The adjusted CIS link is adapted to the service requirement feature, and may be used to transmit service data of the target service corresponding to the service requirement feature. For example, when the service requirement feature is that the data transmitted on the CIS link changes from the data of the initial service to the data of the target service, the adjusted CIS link is used to transmit the data of the target service. In addition to transmission of data of different services, the service requirement feature and the adjusted CIS link may further correspond to another requirement. This is not limited herein. For example, when the target service is a high bit rate data transmission service, the service requirement feature may be that the CIS link changes from transmitting low bit rate data to transmitting high bit rate data, and the adjusted CIS link is used to transmit the high bit rate data. This is not limited herein.

In this embodiment, the data of the target service may be the audio data. In addition to the audio data, the data of the initial service may alternatively be other data, for example, the video data. This is not limited herein.

In this embodiment, the link update message is sent, the transmission rate of the CIS link is adjusted at the adjustment moment based on the target link parameter, and a new data transmission requirement is met on the adjusted CIS link. In a process in which the CIS link adapts to a new transmission rate, the CIS link does not need to be disconnected and reconnected, and the data transmission is not interrupted. This ensures timely data transmission.

In embodiments shown in FIG. 2 and FIG. 3, only a CIS link adjustment method between a Bluetooth master device and one Bluetooth slave device is shown. The Bluetooth master device may establish CIS links with a plurality of Bluetooth slave devices at the same time. In this case, the parameter and the message generated and sent by the Bluetooth master device are all for each Bluetooth slave device, and a CIS link corresponding to the slave device is adjusted. For details, refer to descriptions of embodiments in FIG. 5 or FIG. 6.

Figure 4:
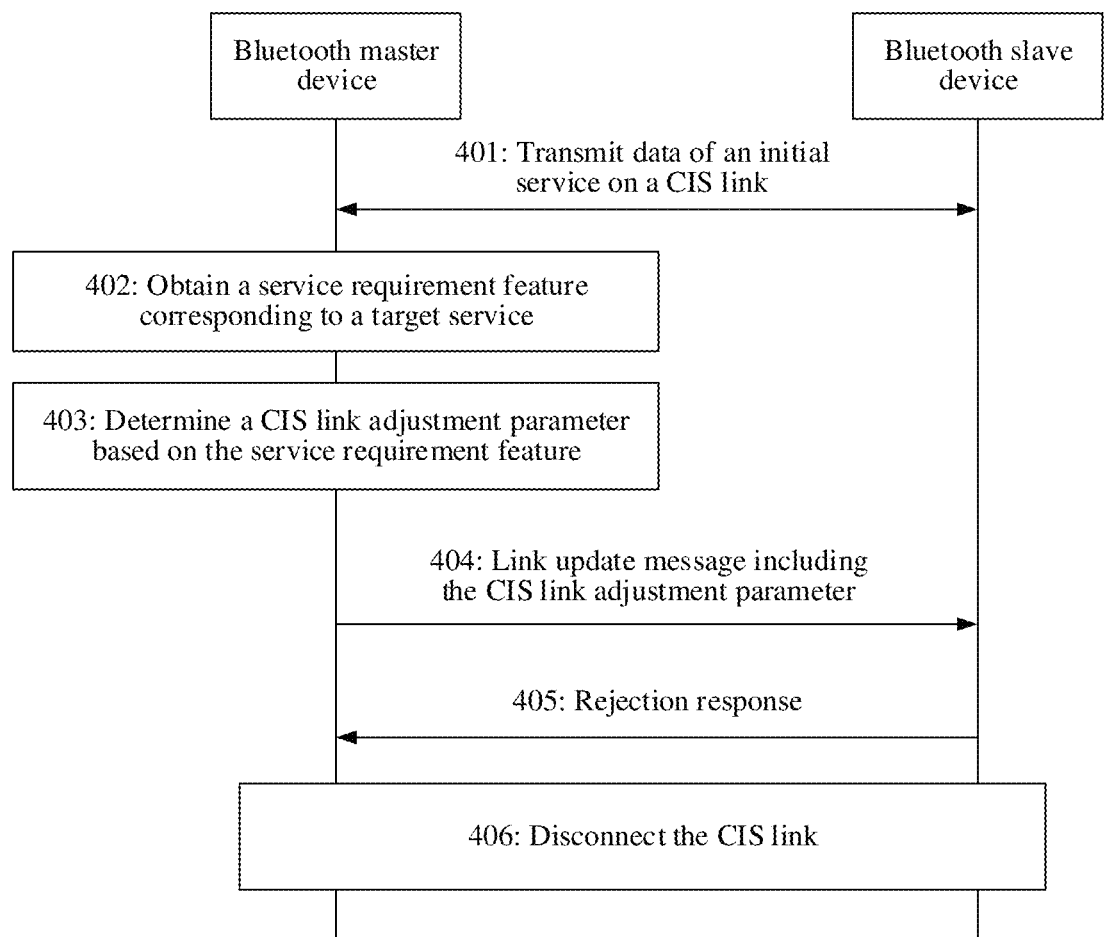
FIG. 4 is another schematic flowchart of a CIS link adjustment method according to an embodiment of this disclosure.

In embodiments of this disclosure, a transmission state of the CIS link may alternatively be changed based on a data transmission state of the slave party. FIG. 4 is a schematic flowchart of a CIS link adjustment method according to an embodiment of this disclosure. The method includes the following steps.

401: A Bluetooth master device transmits data of an initial service to a Bluetooth slave device on a CIS link.

402: The Bluetooth master device obtains a service requirement feature corresponding to a target service.

403: The Bluetooth master device generates a CIS link adjustment parameter based on the service requirement feature.

404: The Bluetooth master device sends, to the Bluetooth slave device, a link update message including the CIS link adjustment parameter.

Step 401 to step 404 are similar to step 201 to step 204 in the embodiment in FIG. 2.

405: The Bluetooth slave device sends a rejection response to the Bluetooth master device.

The Bluetooth slave device may not only establish the CIS link with the Bluetooth master device, but also establish a communication link with another main control party device. If the Bluetooth slave device establishes the communication link with the another main control party device, and a data transmission task with the another main control party device is not completed in a specific time period after the link update message from the Bluetooth master device is received, no data can be transmitted between the Bluetooth slave device and the Bluetooth master device within the time period. In this embodiment, this state is referred to as an engaged state. In this embodiment, the Bluetooth slave device in the engaged state may also be referred to as a target Bluetooth slave device.

Therefore, the Bluetooth slave device may send the rejection response to the Bluetooth master device, to reject data transmission on the CIS link.

Optionally, the rejection response may further include a time duration identifier of the time period, which indicates a time duration in which data cannot be transmitted with the Bluetooth master device.

406: The Bluetooth master device and the Bluetooth slave device disconnect the CIS link.

If the Bluetooth master device receives the rejection response and determines that the Bluetooth slave device cannot transmit the data to the Bluetooth master device, the Bluetooth master device and the Bluetooth slave device may disconnect the CIS link.

Optionally, if the rejection response carries the time duration identifier, the Bluetooth master device may re-determine a target link parameter, a synchronization moment identifier, and an adjustment moment, to adjust the CIS link. The Bluetooth master device transmits the data on an adjusted CIS link at time at which the Bluetooth slave device can transmit the data to the Bluetooth master device.

In this embodiment, if the Bluetooth slave device cannot transmit the data to the Bluetooth master device, the Bluetooth slave device sends the rejection response to the Bluetooth master device. The Bluetooth master device disconnects a first CIS link based on the rejection response, and releases a bandwidth resource of the first CIS link, and uses the bandwidth resource of the first CIS link for another data transmission task, so that a bandwidth resource that cannot be used originally can be fully used. This reduces a waste of bandwidth resources, and increases a bandwidth resource utilization rate.

Actually, in this embodiment, the CIS link is adjusted. An adjustment on the CIS link causes a change of a transmission rate of the CIS link. In other words, the change of the transmission rate of the CIS link reflects the adjustment on the CIS link. Therefore, in this embodiment, the adjustment on the CIS link is referred to as an adjustment on the transmission rate of the CIS link.

In this embodiment, a purpose of adjusting the transmission rate of the CIS link is to adapt to a change of a data transmission service, that is, to implement data transmission of the target service. The target service may correspond to changes in different aspects. For different changes, a CIS link adjustment manner is also different. The following describes different target services.

1. The target service is related to a type of a service corresponding to data transmitted on the CIS link.

Figure 5:
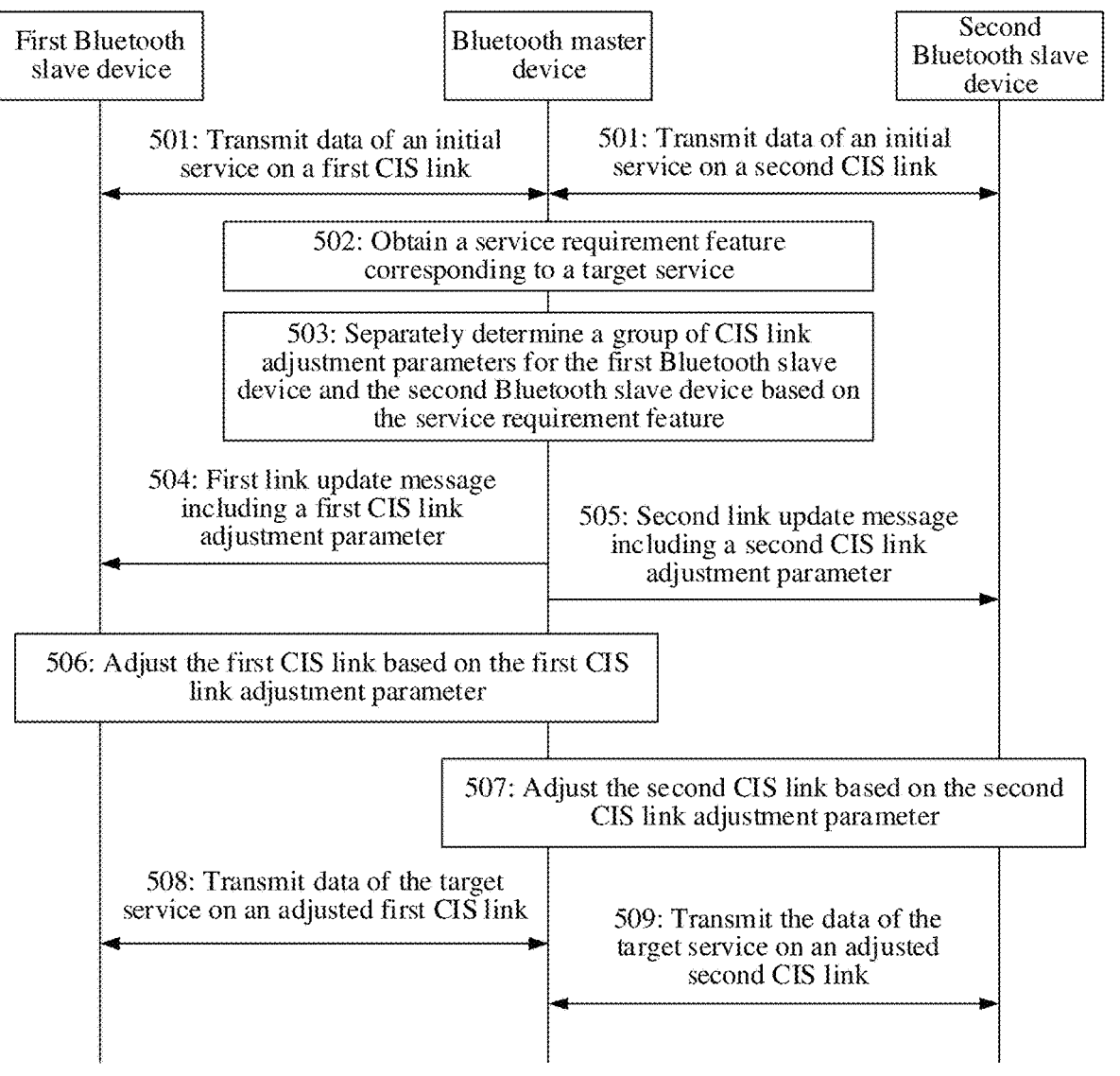
FIG. 5 is still another schematic flowchart of a CIS link adjustment method according to an embodiment of this disclosure.

When the target service is related to the type of the service corresponding to the data transmitted on the CIS link, the CIS link is adjusted for a target service having a new type of a service. FIG. 5 is a schematic flowchart of a CIS link adjustment method according to an embodiment of this disclosure. The method includes the following steps.

501: A Bluetooth master device transmits data of an initial service to a first Bluetooth slave device on a CIS link, and transmits data of an initial service to a second Bluetooth slave device on a second CIS link.

There may be a plurality of Bluetooth slave devices, and this embodiment is described by using two Bluetooth slave devices as an example. The two Bluetooth slave devices are the first Bluetooth slave device and the second Bluetooth slave device.

It should be noted that, in this embodiment, only two Bluetooth slave devices are used as an example, and a quantity of Bluetooth slave devices is not limited.

A first CIS link is established between the Bluetooth master device and the first Bluetooth slave device, and the second CIS link is established between the Bluetooth master device and the second Bluetooth slave device. In this case, the first CIS link and the second CIS link are used to transmit the data corresponding to the initial service, that is, the data of the initial service. The Bluetooth master device may transmit first service data to the first Bluetooth slave device on the first CIS link, and transmit the data of the initial service to the second Bluetooth slave device on the second CIS link.

In this embodiment, the data of the initial service may be audio data. In addition to the audio data, the data of the initial service may alternatively be other data, for example, video data. This is not limited herein.

A CIS communication system is formed among the Bluetooth master device, the first Bluetooth slave device, and the second Bluetooth slave device. The system is configured to transmit the data between the Bluetooth master device and the two Bluetooth slave devices. The system includes one main control party and a plurality of slave parties. In a case in which there are the plurality of slave parties, a connection relationship between devices in the communication system is in FIG. 4.

FIG. 6*a* is a topology diagram of connections between devices in a communication system according to an embodiment of this disclosure. As shown in FIG. 6*a*, the main control party may be connected to the plurality of slave parties, for example, S1, S2, and Sn in FIG. 6*a*. The main control party may send data from the same source to a plurality of slave parties devices connected to the main control party, or may receive data from each slave device. This is not limited herein.

It should be noted that this embodiment is merely an example of a connection relationship, and does not constitute a limitation on a quantity of slave devices. The quantity of slave devices may be any other integer, for example, one or three. This is not limited herein.

Each parameter of data transmission and communication links is mainly determined by the main control party. Optionally, the slave party may also send a message to the main control party, to reflect a situation of the slave party, so that the main control party adjusts each parameter based on the situation of the slave party.

If the communication system includes the plurality of slave parties, the main control party separately establishes communication links with the plurality of slave parties, and the main control party combines the CIS links with the plurality of slave parties into a group of connected isochronous stream group (CIG) links to perform unified receiving and sending scheduling.

502: The Bluetooth master device obtains a service requirement feature corresponding to a target service.

When a service of data transmitted between the Bluetooth master device, the first Bluetooth slave device and the second Bluetooth slave device changes from the initial service to the target service, or is to change to the target service, the Bluetooth master device may obtain the service requirement feature corresponding to the target service.

The service requirement feature indicates that data transmitted on the first CIS link and the second CIS link is adjusted from the data of the initial service to data of the target service. The initial service and the target service belong to different services, and a CIS link parameter corresponding to the data of the initial service is also different from a CIS link parameter corresponding to the data of the target service.

In this embodiment, the service requirement feature indicates switching from the initial service to the target service. The initial service may include audio playback. In addition to the audio playback, the initial service may further include another service, for example, a voice assistant, a call, high bit rate audio playback/voice assistant/call, and low bit rate audio playback/voice assistant/call. This is not limited herein. The target service may include services such as a voice assistant, a call, audio playback, high bit rate audio playback/voice assistant/call, and low bit rate audio playback/voice assistant/call, provided that the target service is different from the initial service.

503: The Bluetooth master device separately determines a group of CIS link adjustment parameters for the first Bluetooth slave device and the second Bluetooth slave device based on the service requirement feature.

The Bluetooth master device may separately determine the groups of CIS link adjustment parameters for the first Bluetooth slave device and the second Bluetooth slave device based on the service requirement feature.

Because the Bluetooth master device, the first Bluetooth slave device, and the second Bluetooth slave device form a CIS communication system, an adjustment on the first CIS link and an adjustment on the second CIS link affect each other. The Bluetooth master device needs to determine a target link parameter, a synchronization moment identifier, and an adjustment moment based on the service requirement feature, the first CIS link, and the second CIS link.

To describe an adjustment on the CIS communication system, that is, the first CIS link and the second CIS link, how data transmission of the CIS communication system is performed before the adjustment needs to be described first. The following provides descriptions with reference to FIG. 6*b*.

FIG. 6*b* is a communication time sequence diagram of a CIS link adjustment method according to an embodiment of this disclosure. The communication time sequence diagram of the first Bluetooth slave device indicates a data receiving and sending time sequence of the first Bluetooth slave device, and one CIS1 event interval includes two CIS1 sub-event intervals. A communication time sequence diagram of the second Bluetooth slave device indicates a data receiving and sending time sequence of the second Bluetooth slave device, and one CIS2 event interval includes two CIS2 sub-event intervals. The CIS1 event and the CIS2 event form a CIG event. The CIS1 event interval is the same as the CIS2 event interval and the CIG event interval.

Optionally, the CIG event may further include a time sequence relationship for performing data transmission on a plurality of CIS links in the CIG and/or a respective link parameter of the plurality of CIS links in the CIG.

In the figure, a white rectangular box represents a data transmission time sequence between the Bluetooth master device and the first Bluetooth slave device, that is, a data transmission time sequence of the first CIS link; and a gray rectangular box represents a data transmission time sequence between the Bluetooth master device and the second Bluetooth slave device, that is, a data transmission time sequence of the second CIS link. For the Bluetooth master device, it needs to be ensured that a CIS sub-event of the first CIS link and a CIS sub-event of the second CIS link do not overlap in terms of time, that is, it is ensured that data of the two CIS links is transmitted alternately in terms of time.

If the first CIS link needs to be adjusted, a time sequence of the second CIS link also needs to be changed. Therefore, in a CIS communication system of the plurality of slave devices, if the first CIS link is adjusted, the second CIS link also needs to be adjusted. A first CIS link adjustment parameter, and a second CIS link adjustment parameter of the second CIS link need to be determined based on the requirement feature.

For example, the first CIS link adjustment parameter may include a first target link parameter, a first synchronization moment identifier, and a target adjustment moment for the first Bluetooth slave device; and the second CIS link adjustment parameter may include a second target link parameter, a second synchronization moment identifier, and a target adjustment moment for the second Bluetooth slave device.

It should be noted that in this embodiment, only two slave devices are used as an example, and the quantity of slave devices is not limited. There are m slave devices, and the target link parameter and the synchronization moment identifier need to be determined for m CIS links separately. m is any integer. This is not limited herein.

504: The Bluetooth master device sends, to the first Bluetooth slave device, a first link update message including the first CIS link adjustment parameter.

The first CIS link adjustment parameter is determined, and the Bluetooth master device may send the first link update message to the first Bluetooth slave device. The message carries the first CIS link adjustment parameter. The first link update message is used by the Bluetooth slave device to adjust the first CIS link based on the first CIS link adjustment parameter.

For a format and content of the first link update message, refer to the descriptions of the link update message in step 204 in the embodiment in FIG. 2.

505: The Bluetooth master device sends, to the second Bluetooth slave device, a second link update message including the second CIS link adjustment parameter.

The second target link parameter, the second synchronization moment identifier, and the adjustment moment are determined, and the Bluetooth master device may send the second link update message to the second Bluetooth slave device. The message carries the second CIS link adjustment parameter. The second link update message is used by the second Bluetooth slave device to adjust the second CIS link based on the second CIS link adjustment parameter.

For a format and content of the second link update message, refer to the descriptions of the link update message in step 204 in the embodiment in FIG. 2.

It should be noted that there is no fixed time sequence relationship between step 504 and step 505, and step 505 may be performed before step 504 or simultaneously with step 504, provided that step 505 is performed after step 503. This is not limited herein.

506: The Bluetooth master device and the Bluetooth slave device adjust the first CIS link based on the first CIS link adjustment parameter.

Both the Bluetooth master device and the first Bluetooth slave device obtain the first CIS link adjustment parameter. In this case, the Bluetooth master device and the first Bluetooth slave device may adjust the first CIS link based on the first CIS link adjustment parameter, so that an adjusted first CIS link may be used to transmit the data of the target service. Generally, the adjusted first CIS link and the first CIS link before an adjustment have different transmission rates.

For example, if the first CIS link adjustment parameter includes the first target link parameter, the first synchronization moment identifier, and the target adjustment moment, the Bluetooth master device and the first Bluetooth slave device may adjust, based on the first target link parameter and the first synchronization moment identifier, the first CIS link at a moment indicated by the target adjustment moment.

507: The Bluetooth master device and the second Bluetooth slave device adjust the second CIS link based on the second CIS link adjustment parameter.

Both the Bluetooth master device and the second Bluetooth slave device obtain the second CIS link adjustment parameter. In this case, the Bluetooth master device and the second Bluetooth slave device may adjust the second CIS link based on the second CIS link adjustment parameter, so that an adjusted second CIS link may be used to transmit the data of the target service. Generally, the adjusted second CIS link and the second CIS link before an adjustment have different transmission rates.

For example, if the second CIS link adjustment parameter includes the second target link parameter, the second synchronization moment identifier, and the target adjustment moment, the Bluetooth master device and the second Bluetooth slave device may adjust, based on the second target link parameter and the second synchronization moment identifier, the second CIS link at the moment indicated by the target adjustment moment.

It should be noted that there is no fixed time sequence relationship between step 506 and step 507, and step 507 may be performed before step 506 or simultaneously with step 506, provided that step 506 is performed after step 504 and step 507 is performed after step 505. This is not limited herein.

508: The Bluetooth master device transmits the data of the target service to the first Bluetooth slave device on the adjusted first CIS link.

509: The Bluetooth master device transmits the data of the target service to the second Bluetooth slave device on the adjusted second CIS link.

In this embodiment, the requirement feature indicates an adjustment requirement for the CIS link caused by service switching. Therefore, when a service changes, the CIS link may be adjusted in a timely and accurate manner based on the service requirement by using the link update message, and the data transmission is not interrupted. This ensures timeliness and accuracy of the data transmission.

In this embodiment, in addition to a type corresponding to the service, the target service also represents a requirement in another aspect, for example, a state of the communication link or a data path of the communication link. This is not limited herein.

2. The target service is related to the state of the communication link.

Figure 7:
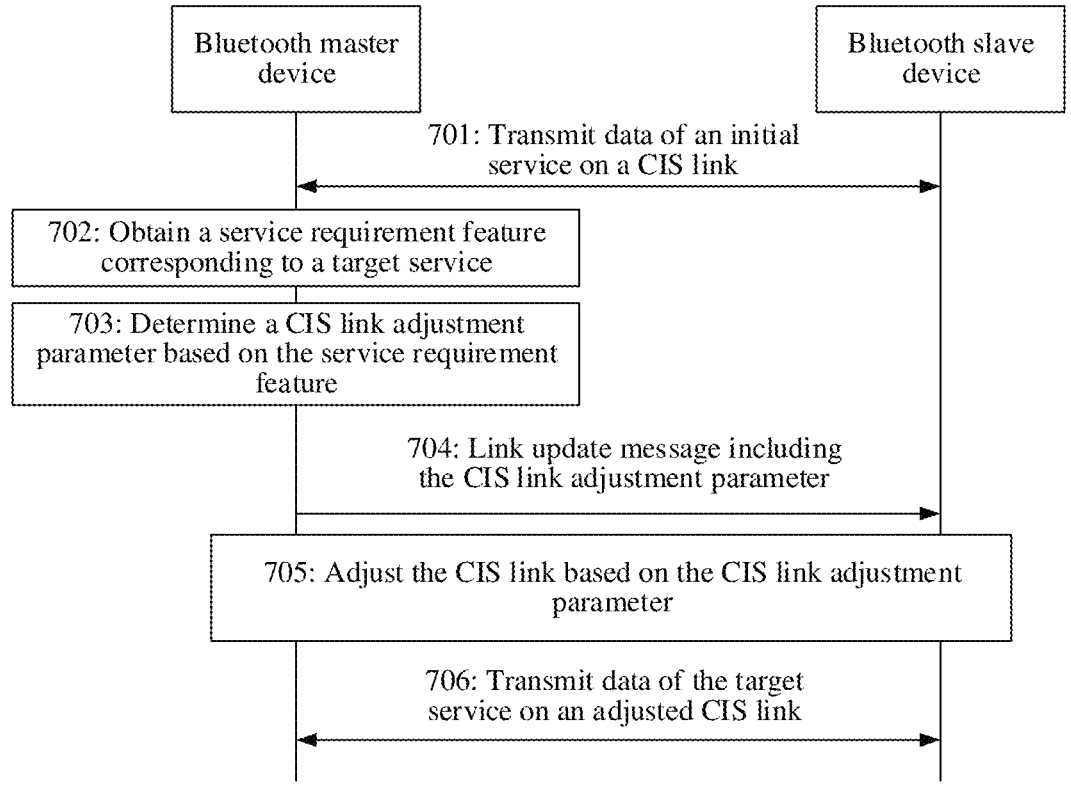
FIG. 7 is yet another schematic flowchart of a CIS link adjustment method according to an embodiment of this disclosure.

FIG. 7 is a schematic flowchart of a link adjustment method according to an embodiment of this disclosure. The method includes the following steps.

701: A Bluetooth master device transmits data of an initial service to a Bluetooth slave device on a CIS link.

Step 701 is similar to step 201 in the embodiment in FIG. 2.

702: The Bluetooth master device obtains a service requirement feature of a target service.

The Bluetooth master device may detect interference of a communication environment, which is also referred to as communication interference, and determine the requirement feature based on the communication interference. If the communication interference is strong, the target service for improving an anti-interference capability of the CIS link may be determined, that is, the service requirement feature for improving the anti-interference capability of the CIS link may be determined. In this embodiment, the anti-interference capability is also referred to as received signal quality. In other words, when the communication interference is strong, the target service and the service requirement feature are for improving the received signal quality of the CIS link.

In this embodiment, if the communication interference is weak, the Bluetooth master device may determine the target service for increasing a transmission rate of the CIS link, that is, may determine the service requirement feature for increasing the transmission rate of the CIS link. Because increasing the transmission rate is usually accompanied by decreasing the received signal quality, the target service for increasing the transmission rate of the CIS link is determined only when the communication interference is weak.

In this embodiment, in addition to determining, based on the communication interference, the service requirement feature for adjusting the received signal quality of the CIS link, the Bluetooth master device may alternatively obtain the service requirement feature in another manner, for example, receive instructions from a user or indicating equipment. The instructions include the service requirement feature for adjusting the received signal quality of the CIS link.

In this embodiment, determining whether signal interference is strong or signal interference is weak may be implemented by using a channel scanning result. For example, when the channel scanning result is less than or equal to a threshold, it is determined that the communication interference is strong; otherwise, it is determined that the communication interference is weak. In this embodiment, in addition to the channel scanning result, strength of the communication interference may be alternatively determined based on other data, for example, a receiving and sending success rate and signal strength. This is not limited herein.

Figure 8:
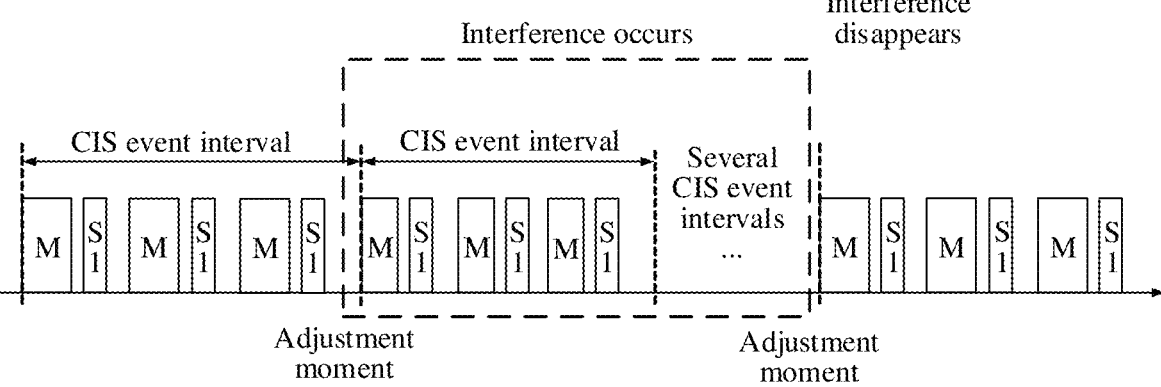
FIG. 8 is still another communication time sequence diagram of a CIS link adjustment method according to an embodiment of this disclosure.

Descriptions are provided with reference to FIG. 8. FIG. 8 is a communication time sequence diagram of a CIS link adjustment method according to an embodiment of this disclosure. When the interference occurs, the Bluetooth master device may detect that the communication interference is strong, to adjust the CIS link at a $1^{st}$ adjustment moment, so that the CIS link has a higher anti-interference capability. When the interference disappears, the Bluetooth master device may detect that the communication interference is weak, to adjust the CIS link at a $2^{nd}$ adjustment moment, so that the CIS link has a higher transmission rate.

703: The Bluetooth master device determines a CIS link adjustment parameter based on the service requirement feature.

The Bluetooth master device may determine, based on the service requirement feature for improving the received signal quality of the CIS link, the CIS link adjustment parameter corresponding to the service requirement feature.

Optionally, the CIS link adjustment parameter may include a target link parameter, a synchronization moment identifier, and an adjustment moment.

Optionally, the received signal quality of the CIS link may be improved by adjusting a physical modulation scheme. In addition to adjusting the physical modulation scheme, the received signal quality of the CIS link may alternatively be improved by using another manner, for example, shortening a CIS sub-event interval. This is not limited herein.

If the requirement feature obtained in step 702 is to increase the transmission rate of the CIS link, the transmission rate of the CIS link may be increased by adjusting the physical modulation scheme, lengthening the CIS sub-event interval, and the like.

704: The Bluetooth master device sends, to the Bluetooth slave device, a link update message including the CIS link adjustment parameter.

705: The Bluetooth master device and the Bluetooth slave device adjust the CIS link based on the CIS link adjustment parameter.

706: The Bluetooth master device transmits data of the target service to the Bluetooth slave device on an adjusted CIS link.

For step 704 to step 706, refer to step 204 to step 206 in the embodiment in FIG. 2.

In this embodiment, the CIS link is adjusted based on the communication environment. The received signal quality of the CIS link is improved when the communication interference is strong. This ensures integrity and reliability of data transmission. The transmission rate of the CIS link is increased when the communication interference is weak. This fully utilizes a bandwidth resource while ensuring data transmission quality, and improves a data transmission speed. In addition, the CIS link may be adjusted in real time based on the communication interference status, to implement an adaptive adjustment on the CIS link for a changed communication environment.

3. The target service is related to a data path of a communication link.

FIG. 9 is a schematic flowchart of a link adjustment method according to an embodiment of this disclosure. The method includes the following steps.

901: A Bluetooth master device transmits data of an initial service to a first Bluetooth slave device on a first CIS link, and transmits data of an initial service to a second Bluetooth slave device on a second CIS link.

Step 901 is similar to step 501 in the embodiment in FIG. 5.

902: The Bluetooth master device obtains a service requirement feature of a target service.

In CIS communication, each CIS sub-event does not necessarily include an uplink data path and a downlink data path. For example, in a call service, uplink data may be received through the first CIS link. In this case, the CIS sub-event of the first CIS link includes both the downlink data path and the uplink data path, and the second CIS link includes only the downlink data path and does not include the uplink data path.

If receiving of the uplink data on the first CIS link needs to be switched to receiving of the uplink data on the second CIS link, a data path of the first CIS link and a data path of the second CIS link need to be adjusted. In this case, a target service for adjusting the data path of the CIS link may be obtained, and a requirement feature for adjusting the data path of the CIS link may be obtained.

903: The Bluetooth master device separately determines a group of CIS link adjustment parameters for the first Bluetooth slave device and the second Bluetooth slave device based on the service requirement feature.

The Bluetooth master device may separately determine the groups of CIS link adjustment parameters for the first Bluetooth slave device and the second Bluetooth slave device based on a service requirement feature.

Optionally, a first CIS link adjustment parameter(s) for the first Bluetooth slave device may include a first target link parameter, a first synchronization moment identifier, and a target adjustment moment that are used to adjust the first CIS link. The second CIS link adjustment parameter(s) for the second Bluetooth slave device may include a second target link parameter, a second synchronization moment identifier, and a target adjustment moment that are used to adjust the second CIS link.

FIG. 10 is a communication time sequence diagram of a CIS link adjustment method according to an embodiment of this disclosure. As shown in FIG. 10, before the uplink data path is changed, the uplink data is transmitted through an S1 path, that is, the first CIS link. Based on the requirement feature, an uplink data path of the first CIS link needs to be disabled, and an uplink data path of the second CIS link needs to be enabled, that is, an S2 path after the uplink data path is changed.

In this case, the Bluetooth master device may set a CIS sub-event interval of the uplink data path of the first CIS link to 0 or a default value. The default value is used to transmit default data, for example, noise reduction reference data. This is not limited herein. The Bluetooth master device sets a sub-event interval of the uplink data path of the second CIS link from 0 or a default value to a fixed value. The fixed value is used to transmit the uplink data. Then, the Bluetooth master device adaptively determines another target link parameter such as the CIS event interval and an update time point based on a change of the uplink data path. This is not limited herein.

904: The Bluetooth master device sends, to the first Bluetooth slave device, a first link update message including the first CIS link adjustment parameter(s).

905: The Bluetooth master device sends, to the second Bluetooth slave device, a second link update message including the second CIS link adjustment parameter(s).

906: The Bluetooth master device and the first Bluetooth slave device adjust the first CIS link based on the first CIS link adjustment parameter(s).

907: The Bluetooth master device and the second Bluetooth slave device adjust the second CIS link based on the second CIS link adjustment parameter(s).

908: The Bluetooth master device transmits data of the target service to the first Bluetooth slave device on an adjusted first CIS link.

909: The Bluetooth master device transmits the data of the target service to the second Bluetooth slave device on an adjusted second CIS link.

For step 904 to step 909, refer to step 506 to step 508 in the embodiment in FIG. 5.

In this embodiment, when the data path of the CIS link needs to change, the target link parameter is determined based on a requirement feature of an adjustment requirement of the data path, and the CIS link is adjusted based on the target link parameter, to adjust the data path of the CIS link.

Figure 11:
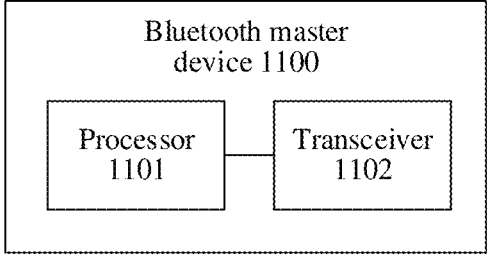
FIG. 11 is a schematic diagram of a structure of a Bluetooth master device according to an embodiment of this disclosure.

The following describes a Bluetooth device provided in an embodiment of this disclosure. FIG. 11 is a schematic diagram of a structure of a Bluetooth master device according to an embodiment of this disclosure.

As shown in FIG. 11, a Bluetooth master device 1100 includes a processor 1101 and a transceiver 1102.

The Bluetooth master device 1100 separately establishes a CIS link with at least one Bluetooth slave device.

The processor 1101 is configured to generate a group of CIS link adjustment parameters for each Bluetooth slave device based on a target service.

The transceiver 1102 is configured to send the corresponding CIS link adjustment parameter(s) to each Bluetooth slave device, to indicate each Bluetooth slave device to dynamically adjust the CIS link based on the corresponding CIS link adjustment parameter(s).

The processor 1101 is further configured to adjust the CIS link.

The transceiver 1102 is further configured to perform data transmission of the target service with at least one Bluetooth device based on an adjusted CIS link.

In some optional implementations, the CIS link adjustment parameter(s) includes a target link parameter, a synchronization moment identifier, and a target adjustment moment, the target link parameter and the synchronization moment identifier indicate to adjust the CIS link, and the target adjustment moment indicates a moment for adjusting the CIS link.

In some optional implementations, the processor 1101 is specifically configured to: obtain a service requirement feature of the target service, where the service requirement feature indicates an adjustment requirement for at least one of the CIS link, a rate of the CIS link, real-time performance of the CIS link, and an anti-interference capability of the CIS link; and generate the group of CIS link adjustment parameters for each Bluetooth slave device based on the service requirement feature.

In some optional implementations, there are a plurality of Bluetooth slave devices, the Bluetooth master device separately establishes the CIS link with the plurality of Bluetooth slave devices, a plurality of CIS links between the Bluetooth master device and the plurality of Bluetooth slave devices are included in a connected isochronous stream group (CIG), and the CIG includes a time sequence relationship for performing data transmission on the plurality of CIS links and/or a respective link parameter of the plurality of CIS links. The processor 1101 is specifically configured to generate the group of CIS link adjustment parameters for each of the plurality of Bluetooth slave devices based on the service requirement feature, the time sequence relationship for performing data transmission on the plurality of CIS links, and/or the respective link parameter of the plurality of CIS links.

In some optional implementations, the service requirement feature indicates an adjustment on data transmitted on the CIS link, and the data transmitted on the CIS link is adjusted from data of an initial service to data of the target service; and the processor 1101 is specifically configured to generate, for each Bluetooth slave device, the group of CIS link adjustment parameters needed to transmit the data of the target service.

In some optional implementations, the service requirement feature indicates to enhance received signal quality of the CIS link; and the processor 1101 is specifically configured to generate, for each Bluetooth slave device, the group of CIS link adjustment parameters for enhancing the signal receiving quality of the CIS link.

In some optional implementations, the service requirement feature indicates an adjustment on a data path of at least one CIS link in the CIG, the data path of the at least one CIS link in the CIG is adjusted from a data path corresponding to an initial service to a target data path corresponding to the target service, and the target data path indicates an uplink state/a downlink state of the CIS link corresponding to a case in which the at least one CIS link corresponds to the target service; and the processor 1101 is specifically configured to generate, for each of the plurality of Bluetooth slave devices, the group of CIS link adjustment parameters corresponding to the target data path.

In some optional implementations, the transceiver 1102 is further configured to receive a rejection response from a target Bluetooth slave device. The rejection response indicates that the target Bluetooth slave device is in an engaged state; and the processor 1101 is further configured to disconnect the CIS link with the target Bluetooth slave device.

The Bluetooth master device 1100 in FIG. 11 is configured to execute actions of the Bluetooth master device in FIG. 2 to FIG. 10, that is, the main control party device.

The Bluetooth master device 1100 may be a device form such as a Bluetooth headset, a Bluetooth chip, or a Bluetooth sound box. This is not limited herein.

Figure 12:
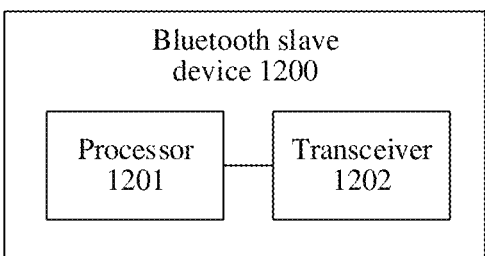
FIG. 12 is a schematic diagram of a structure of a Bluetooth slave device according to an embodiment of this disclosure.

FIG. 12 is a schematic diagram of a structure of a Bluetooth slave device according to an embodiment of this disclosure.

As shown in FIG. 12, the Bluetooth slave device 1200 includes a processor 1201 and a transceiver 1202.

The Bluetooth slave device establishes a CIS link with a Bluetooth master device.

The transceiver 1202 is configured to receive a group of CIS link adjustment parameters from the Bluetooth master device. The group of CIS link adjustment parameters is generated based on a target service.

The processor 1201 is configured to adjust the CIS link based on the group of CIS link adjustment parameters.

In some optional implementations, the CIS link adjustment parameter(s) includes a target link parameter, a synchronization moment identifier, and a target adjustment moment. The target link parameter and the synchronization moment identifier indicate to adjust the CIS link, and the target adjustment moment indicates a moment for adjusting the CIS link.

In some optional implementations, the group of CIS link adjustment parameters is generated based on a service requirement feature of the target service, and the service requirement feature indicates an adjustment requirement for at least one of the CIS link, a rate of the CIS link, real-time performance of the CIS link, and an anti-interference capability of the CIS link.

In some optional implementations, the service requirement feature indicates an adjustment on data transmitted on the CIS link, the data transmitted on the CIS link is adjusted from data of an initial service to data of the target service, and the group of CIS link adjustment parameters includes a group of CIS link adjustment parameters needed to transmit the data of the target service.

In some optional implementations, the service requirement feature indicates to enhance received signal quality of the CIS link, and the group of CIS link adjustment parameters includes a group of CIS link adjustment parameters for enhancing the signal receiving quality of the CIS link.

In some optional implementations, the CIS link between the Bluetooth slave device and the Bluetooth master device is a target CIS link, the target CIS link is included in a connected isochronous stream group (CIG), the CIG includes a plurality of CIS links, and the plurality of CIS links include the target CIS link; the service requirement feature indicates an adjustment on a data path of at least one CIS link in the CIG, the data path of the at least one CIS link in the CIG is adjusted from a data path corresponding to an initial service to a target data path corresponding to the target service, and the target data path indicates an uplink state/a downlink state of the CIS link corresponding to a case in which the at least one CIS link corresponds to the target service; and the group of CIS link adjustment parameters includes a group of CIS link adjustment parameters corresponding to the target data path.

In some optional implementations, the transceiver 1202 is specifically configured to: if the Bluetooth slave device is in an engaged state, send a rejection response to the Bluetooth master device. The rejection response is used to disconnect the CIS link; and the processor 1201 is specifically configured to disconnect the CIS link.

The Bluetooth slave device 1200 in FIG. 12 is configured to execute actions of the Bluetooth slave device in FIG. 2 to FIG. 10, that is, a slave party device.

The Bluetooth slave device 1200 may be a device form such as a Bluetooth headset, a Bluetooth chip, or a Bluetooth sound box. This is not limited herein.

An embodiment of this disclosure further provides a computer program product. When the computer program product is run on a computer, the computer is enabled to perform the steps performed by the Bluetooth master device or the Bluetooth slave device according to the CIS link adjustment method described in embodiments in FIG. 2 to FIG. 10.

An embodiment of this disclosure further provides a computer-readable storage medium. The computer-readable storage medium stores a computer program, and when the program is run on a computer, the computer is enabled to perform the steps performed by the Bluetooth master device or the Bluetooth slave device according to the methods described in embodiments in FIG. 2 to FIG. 10.

The graphics processing apparatus provided in this embodiment may be a chip. The chip includes a processing unit and a communication unit. The processing unit may be, for example, a processor, and the communication unit may be, for example, an input/output interface, a pin, a circuit, or the like. The processing unit may execute computer-executable instructions stored in the storage unit, so that a chip in the training device performs the steps performed by the Bluetooth master device or the Bluetooth slave device according to the methods described in embodiments in FIG. 2 to FIG. 10. Optionally, the storage unit is a storage unit in the chip, such as a register or a cache. Alternatively, the storage unit may be a storage unit that is outside the chip and that is in a wireless access device end, such as a read-only memory (ROM) or another type of static storage device that can store static information and instructions, a random access memory (RAM), or the like.

It may be clearly understood by a person skilled in the art that, for the purpose of convenient and brief description, for a detailed working process of the foregoing system, apparatus, and unit, refer to a corresponding process in the foregoing method embodiments, and In the several embodiments provided in this disclosure, it should be understood that the disclosed system, apparatus, and method may be implemented in another manners. For example, the described apparatus embodiment is merely an example. For example, division into the units is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another forms.

The units described as separate parts may or may not be physically separate, and parts displayed as units may or may not be physical units, may be located in one position, or may be distributed on a plurality of network units. A part of or all of the units may be selected based on actual requirements to achieve a purpose of the solutions of embodiments.

In addition, functional units in embodiments of this disclosure may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or the part contributing to the prior art, or all or a part of the technical solutions may be implemented in the form of a software product. The computer software product is stored in a storage medium and includes several instructions for enabling a computer device (which may be a personal computer, a server, or a network device) to perform all or a part of the steps according to the methods described in embodiments of this disclosure. The foregoing storage medium includes any medium that can store program code, such as a USB flash drive, a removable hard disk drive, a read-only memory (ROM), a random access memory (RAM), a magnetic disk, or an optical disc.

What is claimed is:

1. A connected isochronous stream (CIS) link adjustment method, wherein the method is applied to a Bluetooth master device that separately establishes a CIS link with each of at least one Bluetooth slave device, and the method comprises:

generating, by the Bluetooth master device, a group of CIS link adjustment parameters for each of the at least one Bluetooth slave device based on a target service, wherein the group of CIS link adjustment parameters comprises one or more parameters configured to control an adjustment behavior of the corresponding CIS link;

sending, by the Bluetooth master device, the corresponding group of CIS link adjustment parameters to each of the at least one Bluetooth slave device, to indicate the Bluetooth slave device to dynamically adjust the corresponding CIS link based on the corresponding group of CIS link adjustment parameters;

adjusting, by the Bluetooth master device, the corresponding CIS link with each of the at least one Bluetooth slave device at an adjustment timing indicated by the group of CIS link adjustment parameters to generate an adjusted CIS link; and performing, by the Bluetooth master device, data transmission of the target service with at least one Bluetooth device based on the adjusted CIS links.

2. The method according to claim 1, wherein the group of CIS link adjustment parameters comprises a target link parameter, a synchronization moment identifier, and a target adjustment moment, wherein the target link parameter and the synchronization moment identifier indicate to adjust the corresponding CIS link, and the target adjustment moment indicates a moment for adjusting the corresponding CIS link.

3. The method according to claim 1, wherein the generating, by the Bluetooth master device, a group of CIS link adjustment parameters for each of the at least one Bluetooth slave device based on a target service comprises:

obtaining, by the Bluetooth master device, a service requirement feature of the target service, wherein the service requirement feature indicates an adjustment requirement for at least one CIS link, a rate of at least one CIS link, real-time performance of at least one CIS link, and an anti-interference capability of at least one CIS link; and generating, by the Bluetooth master device, the group of CIS link adjustment parameters for each of the at least one Bluetooth slave device based on the service requirement feature.

4. The method according to claim 3, wherein the at least one Bluetooth slave device comprises a plurality of Bluetooth slave devices, the Bluetooth master device separately establishes the CIS link with each of the plurality of Bluetooth slave devices, a plurality of CIS links between the Bluetooth master device and the plurality of Bluetooth slave devices are comprised in a connected isochronous stream group (CIG), and the CIG comprises a time sequence relationship for performing data transmission on the plurality of CIS links and/or a respective link parameter of the plurality of CIS links; and the generating, by the Bluetooth master device, the group of CIS link adjustment parameters for each of the at least one Bluetooth slave device based on the service requirement feature comprises:

generating, by the Bluetooth master device, the group of CIS link adjustment parameters for each of the plurality of Bluetooth slave devices based on the service requirement feature, the time sequence relationship for performing data transmission on the plurality of CIS links, and/or the respective link parameter of the plurality of CIS links.

5. The method according to claim 3, wherein the service requirement feature indicates an adjustment on data transmitted on the at least one CIS link, and the data transmitted on the at least one CIS link is adjusted from data of an initial service to data of the target service; and the generating a group of CIS link adjustment parameters for each of the at least one Bluetooth slave device comprises:

generating, for each of the at least one Bluetooth slave device, the group of CIS link adjustment parameters needed to transmit the data of the target service.

6. The method according to claim 3, wherein the service requirement feature indicates to enhance signal receiving quality of the at least one CIS link; and the generating a group of CIS link adjustment parameters for each of the at least one Bluetooth slave device comprises:

generating, for each of the at least one Bluetooth slave device, the group of CIS link adjustment parameters for enhancing the signal receiving quality of the corresponding CIS link.

7. The method according to claim 4, wherein the service requirement feature indicates an adjustment on a data path of at least one CIS link in the CIG, the data path of the at least one CIS link in the CIG is adjusted from a data path corresponding to an initial service to a target data path corresponding to the target service, and the target data path indicates an uplink state/a downlink state of the at least one CIS link corresponding to a case in which the at least one CIS link corresponds to the target service; and the generating the group of CIS link adjustment parameters for each of the plurality of Bluetooth slave devices comprises:

generating, for each of the plurality of Bluetooth slave devices, the group of CIS link adjustment parameters corresponding to the target data path.

8. The method according to claim 1, further comprising:

disconnecting, by the Bluetooth master device, the CIS link with a target Bluetooth slave device in the at least one Bluetooth slave device when receiving a rejection response from the target Bluetooth slave device, wherein the rejection response indicates that the target Bluetooth slave device is in an engaged state.

9. A connected isochronous stream (CIS) link adjustment method, wherein the method is applied to a Bluetooth slave device that establishes a CIS link with a Bluetooth master device, and the method comprises:

receiving, by the Bluetooth slave device, a group of CIS link adjustment parameters from the Bluetooth master device, wherein the group of CIS link adjustment parameters comprises one or more parameters configured to control an adjustment behavior of the CIS link, and is generated based on a target service; and adjusting, by the Bluetooth slave device, the CIS link at an adjustment timing indicated by the group of CIS link adjustment parameters.

10. The method according to claim 9, wherein the group of CIS link adjustment parameters comprises a target link parameter, a synchronization moment identifier, and a target adjustment moment, wherein the target link parameter and the synchronization moment identifier indicate to adjust the CIS link, and the target adjustment moment indicates a moment for adjusting the CIS link.

11. The method according to claim 9, wherein the group of CIS link adjustment parameters is generated based on a service requirement feature of the target service, and the service requirement feature indicates an adjustment requirement for the CIS link, a rate of the CIS link, real-time performance of the CIS link, and an anti-interference capability of the CIS link.

12. The method according to claim 11, wherein the service requirement feature indicates an adjustment on data transmitted on the CIS link, and the data transmitted on the CIS link is adjusted from data of an initial service to data of the target service; and the group of CIS link adjustment parameters comprises a group of CIS link adjustment parameters needed to transmit the data of the target service.

13. The method according to claim 11, wherein the service requirement feature indicates to enhance signal receiving quality of the CIS link; and the group of CIS link adjustment parameters comprises a group of CIS link adjustment parameters for enhancing the signal receiving quality of the CIS link.

14. The method according to claim 11, wherein the CIS link between the Bluetooth slave device and the Bluetooth master device is a target CIS link, the target CIS link is comprised in a connected isochronous stream group (CIG), the CIG comprises a plurality of CIS links, and the plurality of CIS links comprise the target CIS link;

the service requirement feature indicates an adjustment on a data path of at least one CIS link in the CIG, the data path of the at least one CIS link in the CIG is adjusted from a data path corresponding to an initial service to a target data path corresponding to the target service, and the target data path indicates an uplink state/a downlink state of the CIS link corresponding to a case in which the at least one CIS link corresponds to the target service; and the group of CIS link adjustment parameters comprises a group of CIS link adjustment parameters corresponding to the target data path.

15. The method according to claim 9, wherein after the receiving, by the Bluetooth slave device, a group of CIS link adjustment parameters from the Bluetooth master device, the method further comprises:

sending, by the Bluetooth slave device, a rejection response to the Bluetooth master device if the Bluetooth slave device is in an engaged state, wherein the rejection response is used to disconnect the CIS link; and disconnecting, by the Bluetooth slave device, the CIS link.

16. A Bluetooth master device, comprising:

at least one processor and a transceiver, wherein the Bluetooth master device separately establishes a CIS link with each of at least one Bluetooth slave device;

the at least one processor is configured to generate a group of CIS link adjustment parameters for each of the at least one Bluetooth slave device based on a target service, wherein the group of CIS link adjustment parameters comprises one or more parameters configured to control an adjustment behavior of the corresponding CIS link;

the transceiver is configured to send the corresponding group of CIS link adjustment parameters to each of the at least one Bluetooth slave device, to indicate the Bluetooth slave device to dynamically adjust the corresponding CIS link based on the corresponding group of CIS link adjustment parameters;

the at least one processor is further configured to adjust the corresponding CIS link with each of at least one Bluetooth slave device at an adjustment timing indicated by the group of CIS link adjustment parameters to generate an adjusted CIS link; and the transceiver is further configured to perform data transmission of the target service with at least one Bluetooth device based on the adjusted CIS links.

17. The device according to claim 16, wherein the group of CIS link adjustment parameters comprises a target link parameter, a synchronization moment identifier, and a target adjustment moment, wherein the target link parameter and the synchronization moment identifier indicate to adjust the corresponding CIS link, and the target adjustment moment indicates a moment for adjusting the CIS link.

18. The device according to claim 16, wherein the at least one processor is further configured to:

obtain a service requirement feature of the target service, wherein the service requirement feature indicates an adjustment requirement for at least one CIS link, a rate of at least one CIS link, real-time performance of at least one CIS link, and an anti-interference capability of at least one CIS link; and generate the group of CIS link adjustment parameters for each of the at least one Bluetooth slave device based on the service requirement feature.

19. The device according to claim 18, wherein the at least one Bluetooth slave device comprises a plurality of Bluetooth slave devices, the Bluetooth master device separately establishes the CIS link with each of the plurality of Bluetooth slave devices, a plurality of CIS links between the Bluetooth master device and the plurality of Bluetooth slave devices are comprised in a connected isochronous stream group (CIG), and the CIG comprises a time sequence relationship for performing data transmission on the plurality of CIS links and/or a respective link parameter of the plurality of CIS links; and the at least one processor is further configured to generate the group of CIS link adjustment parameters for each of the plurality of Bluetooth slave devices based on the service requirement feature, the time sequence relationship for performing data transmission on the plurality of CIS links, and/or the respective link parameter of the plurality of CIS links.

20. The device according to claim 18, wherein the service requirement feature indicates an adjustment on data transmitted on the at least one CIS link, and the data transmitted on the at least one CIS link is adjusted from data of an initial service to data of the target service; and the at least one processor is further configured to generate, for each of the at least one Bluetooth slave device, the group of CIS link adjustment parameters needed to transmit the data of the target service.

* * * * *